(12) United States Patent
Colmard et al.

(10) Patent No.: US 11,383,799 B2
(45) Date of Patent: Jul. 12, 2022

(54) FLOATING SUPPORT STRUCTURE FOR OFFSHORE WIND TURBINE AND METHOD FOR INSTALLING A WIND TURBINE PROVIDED WITH SUCH A SUPPORT STRUCTURE

(71) Applicant: SAIPEM S.A., Montigny le Bretonneux (FR)

(72) Inventors: Christophe Colmard, Guyancourt (FR); Paul Franc, Paris (FR); Jean-Baptiste Le Clezio, Versailles (FR); Frédéric Gentil, Montigny le Bretonneux (FR); Thierry Delahaye, Vanves (FR); Nicolas Chazot, Gif sur Yvette (FR); Raymond Hallot, Voisins le Bretonneux (FR)

(73) Assignee: SAIPEM S.A., Montigny le (FR)

( * ) Notice: Subject to any disclaimer, the term of this patent is extended or adjusted under 35 U.S.C. 154(b) by 181 days.

(21) Appl. No.: 16/767,474

(22) PCT Filed: Dec. 27, 2018

(86) PCT No.: PCT/FR2018/053006
§ 371 (c)(1),
(2) Date: May 27, 2020

(87) PCT Pub. No.: WO2019/106283
PCT Pub. Date: Jun. 6, 2019

(65) Prior Publication Data
US 2020/0391834 A1    Dec. 17, 2020

(30) Foreign Application Priority Data
Nov. 29, 2017  (FR) ...................... 1761342

(51) Int. Cl.
| | | |
|---|---|---|
| *B63B 35/44* | (2006.01) | |
| *F03D 13/25* | (2016.01) | |
| *B63B 77/10* | (2020.01) | |

(52) U.S. Cl.
CPC .............. *B63B 35/44* (2013.01); *B63B 77/10* (2020.01); *F03D 13/25* (2016.05); *B63B 2035/446* (2013.01); *F05B 2230/60* (2013.01)

(58) Field of Classification Search
CPC ... B63B 35/44; B63B 2035/446; B63B 77/10; F03D 13/25; F05B 2230/60
See application file for complete search history.

(56) References Cited

U.S. PATENT DOCUMENTS

| | | | |
|---|---|---|---|
| 10,774,813 B2 | 9/2020 | Fernandez Gomez et al. | |
| 2003/0168864 A1* | 9/2003 | Heronemus | F03D 9/255 290/55 |

(Continued)

FOREIGN PATENT DOCUMENTS

| | | | | |
|---|---|---|---|---|
| AU | 2018376719 A1 * | 5/2020 | ............. | B63B 35/44 |
| CN | 104802952 A | 7/2015 | | |

(Continued)

OTHER PUBLICATIONS

Extended Search Report from corresponding EP Application No. EP21162730.2, dated Jun. 10, 2021.

(Continued)

*Primary Examiner* — S. Joseph Morano
*Assistant Examiner* — Jovon E Hayes
(74) *Attorney, Agent, or Firm* — Workman Nydegger

(57) ABSTRACT

A floating support structure for an offshore wind turbine, comprises a float intended to be partly immersed and on which a wind turbine mast is intended to be assembled, and a counterweight connected to the float and intended to be immersed under the float. The float comprises a toroid or (Continued)

polygon-shaped main structure with at least five sides, a central tubular structure having a diameter adapted to receive the mast of the wind turbine and comprising a section able to be ballasted in order to adjust the waterline of the float, a first series of horizontal struts distributed about a vertical axis and connecting the main structure to the central structure, and a second series of oblique struts distributed about a vertical axis and connecting the main structure to the central structure at an angle comprised between 15° and 60° with the horizontal struts.

16 Claims, 26 Drawing Sheets

(56) References Cited

U.S. PATENT DOCUMENTS

| | | | |
|---|---|---|---|
| 2008/0240864 A1* | 10/2008 | Belinsky | F03D 13/22 |
| | | | 290/55 |
| 2013/0019792 A1* | 1/2013 | Jahnig | B63B 3/04 |
| | | | 114/267 |
| 2017/0051724 A1* | 2/2017 | Dagher | B63B 5/24 |
| 2018/0148140 A1* | 5/2018 | Fernandez Gomez | |
| | | | B63B 21/20 |
| 2018/0170488 A1 | 6/2018 | Fernandez Gomez et al. | |
| 2020/0391834 A1* | 12/2020 | Colmard | B63B 77/10 |

FOREIGN PATENT DOCUMENTS

| | | | | |
|---|---|---|---|---|
| EP | 3153398 A1 | | 4/2017 | |
| JP | 2002-285951 A | | 10/2002 | |
| JP | 2002285951 A | * | 10/2002 | ............ F03D 13/22 |
| JP | 2015-009591 A | | 1/2015 | |
| JP | 2015009591 A | * | 1/2015 | ............ B63B 35/44 |
| KR | 20170008869 A | | 1/2017 | |
| WO | 2016/161931 A1 | | 10/2016 | |
| WO | 2017/157399 A1 | | 9/2017 | |

OTHER PUBLICATIONS

Office Action from corresponding Korean Application No. 10-2020-7013413, dated Feb. 17, 2021.
Search Report from corresponding French Application No. FR 1761342, dated Jul. 11, 2018.
International Search Report and Written Opinion from PCT Application No. PCT/FR2018/053006, dated Mar. 5, 2019.

* cited by examiner

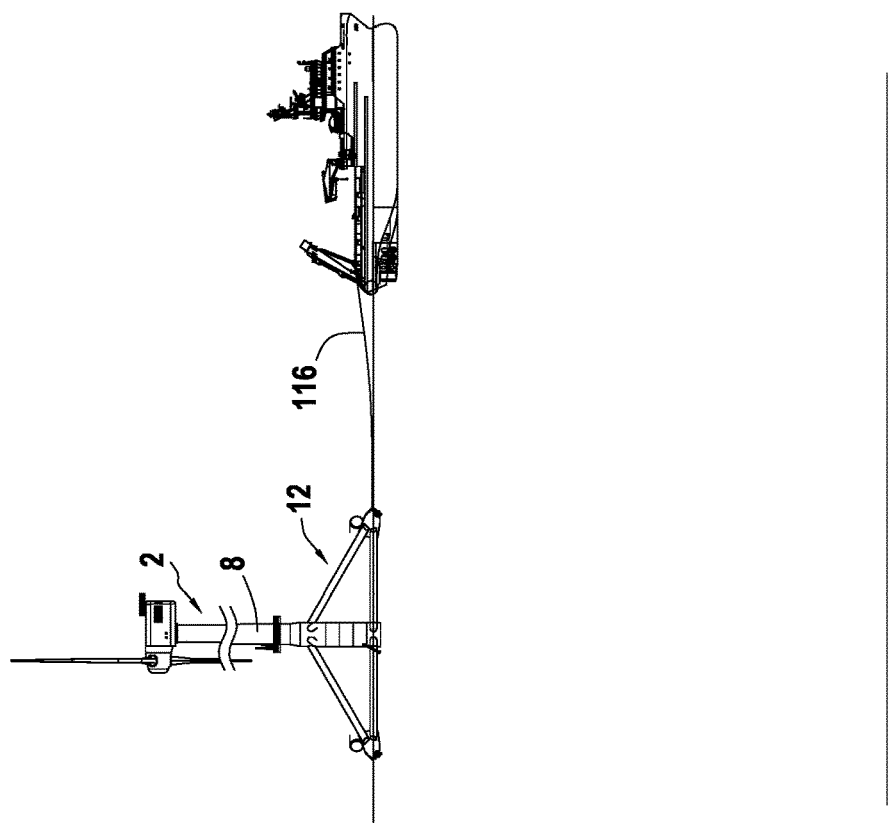
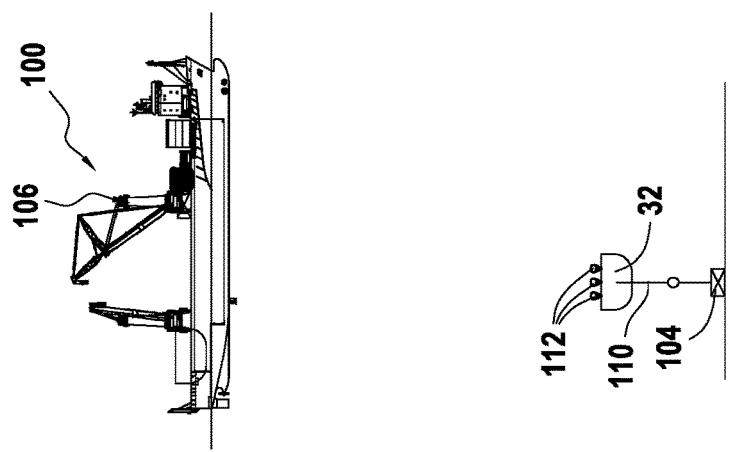
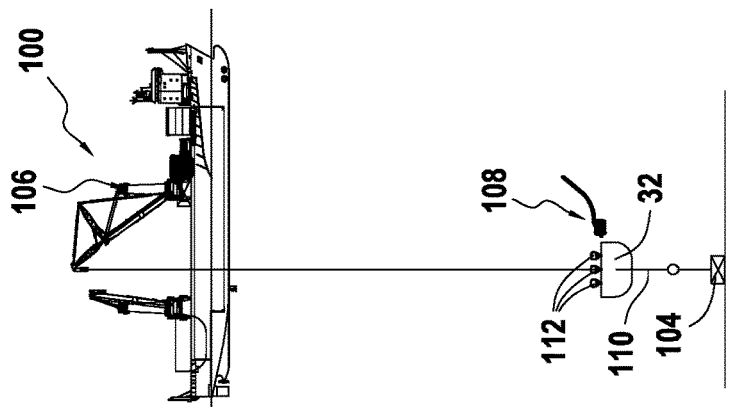

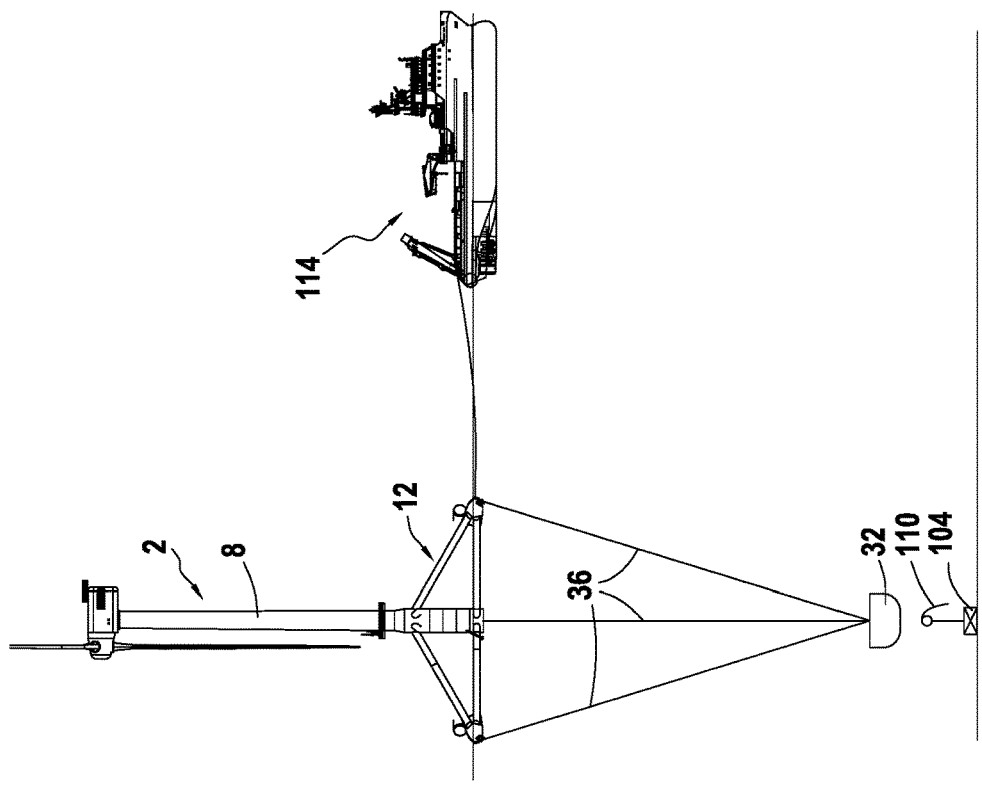
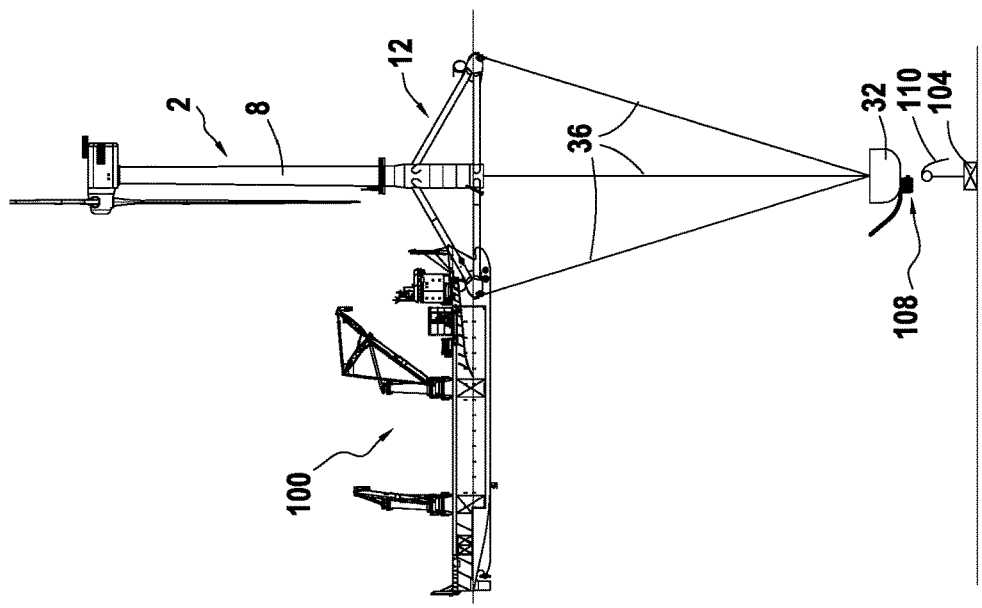
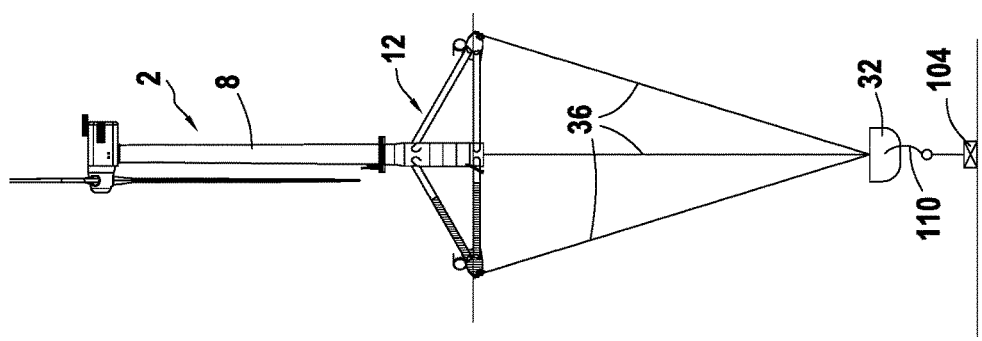

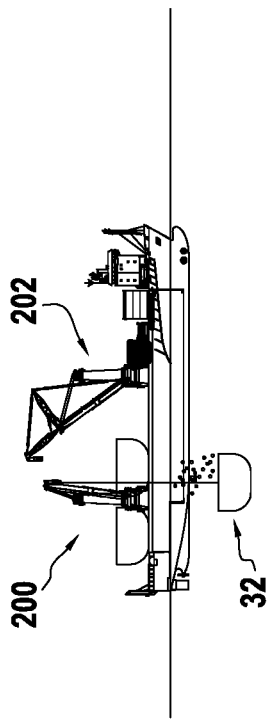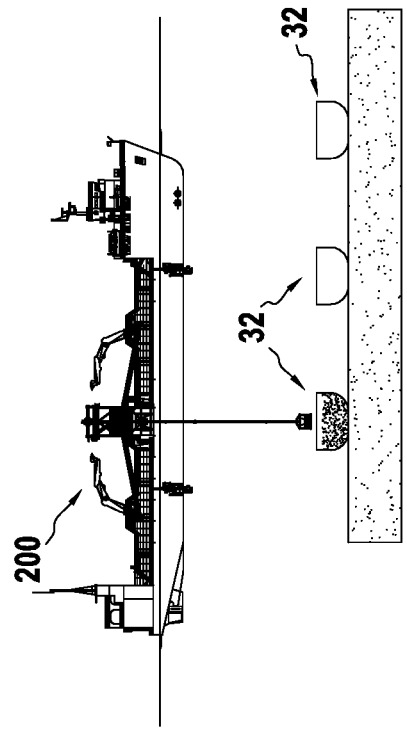
FIG.7A
FIG.7B
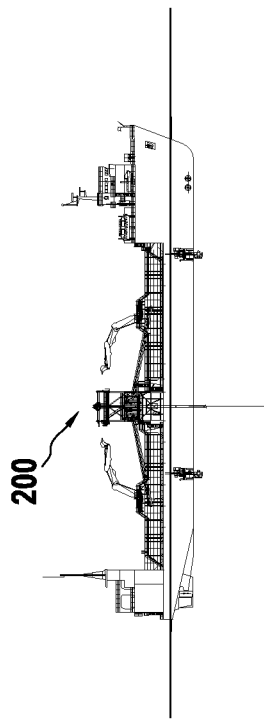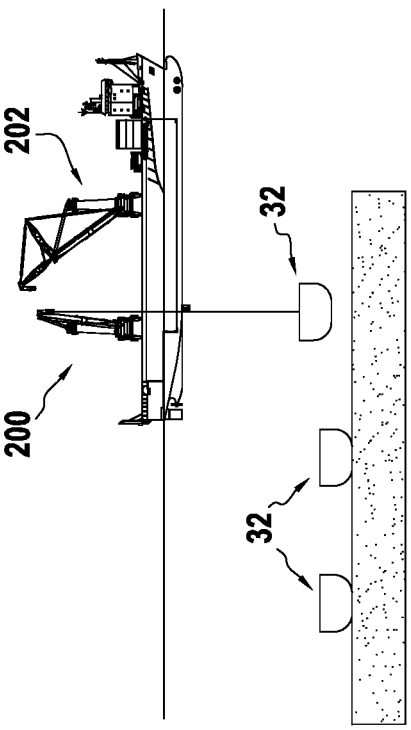
FIG.7C
FIG.7D

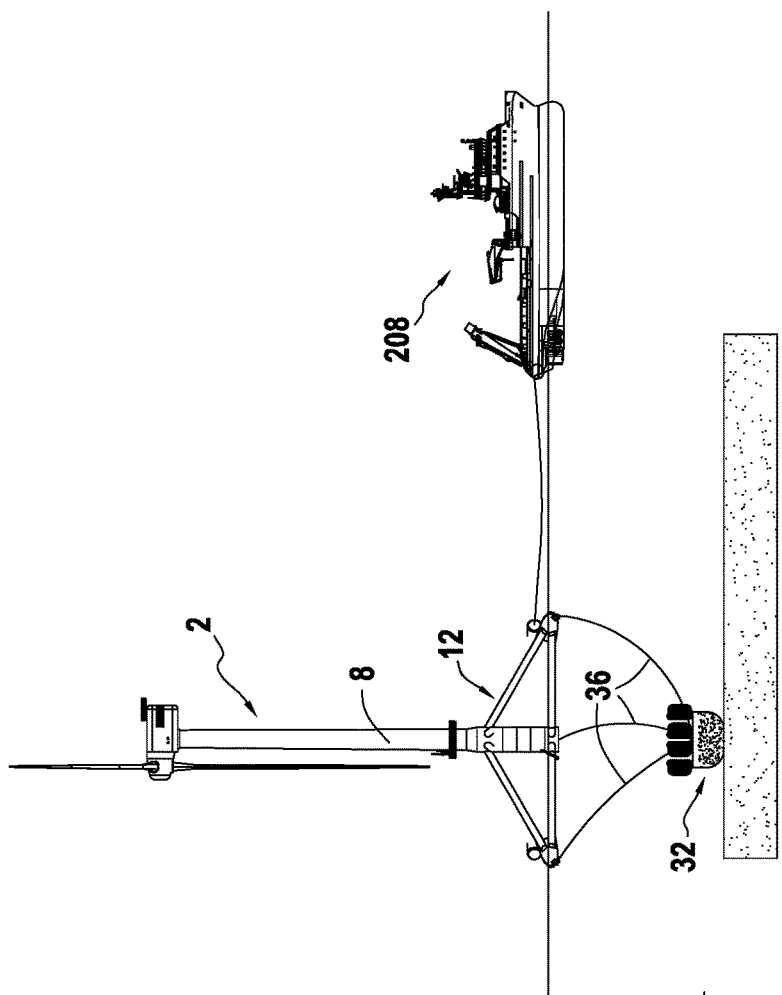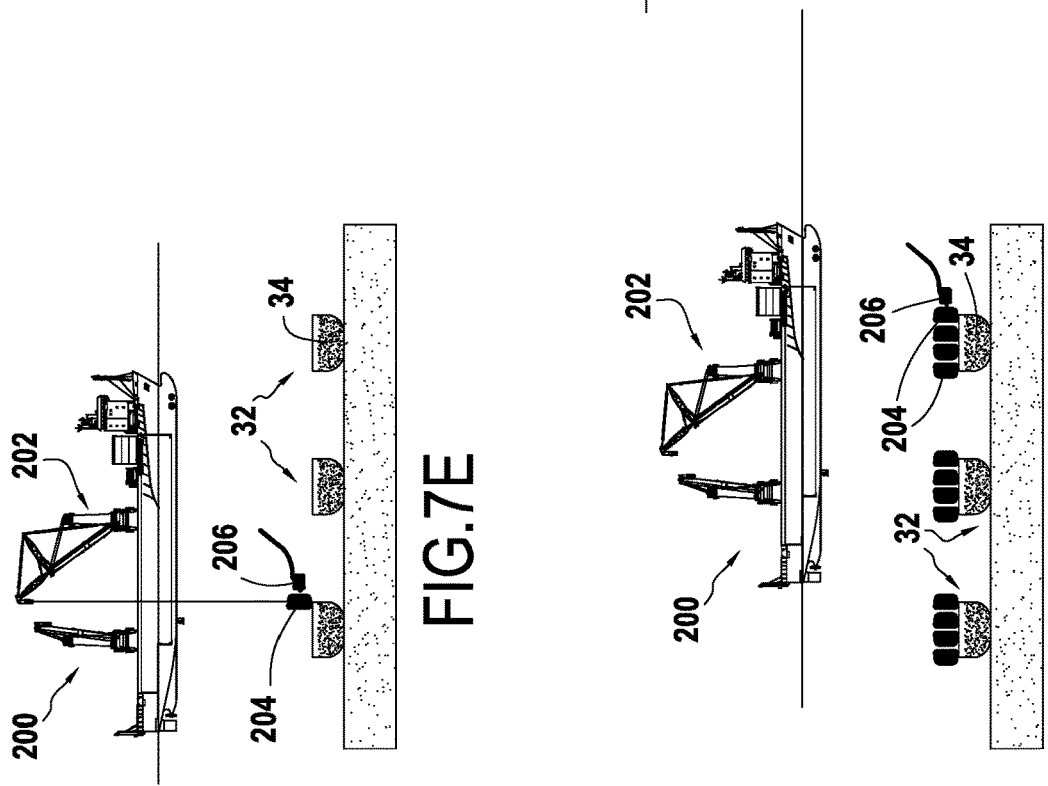

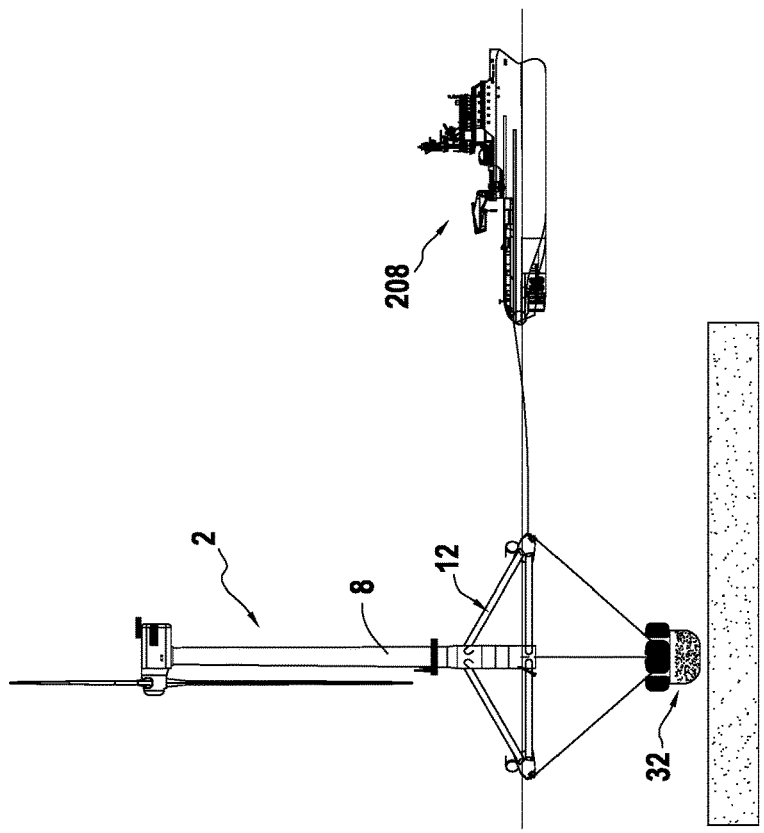
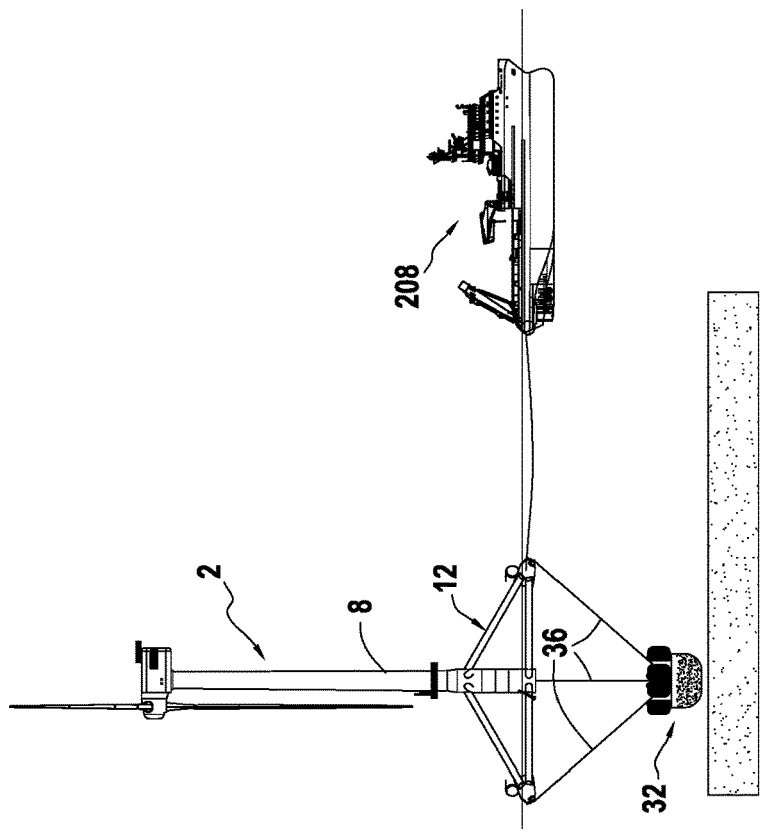

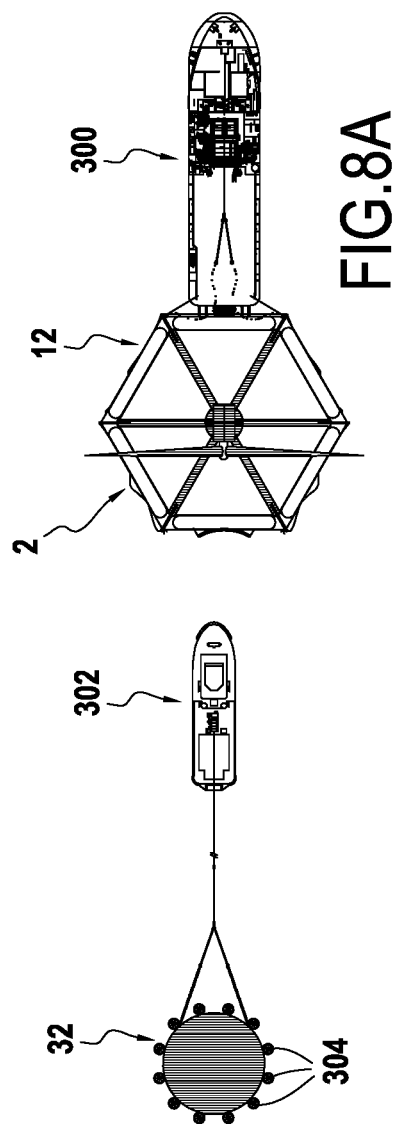
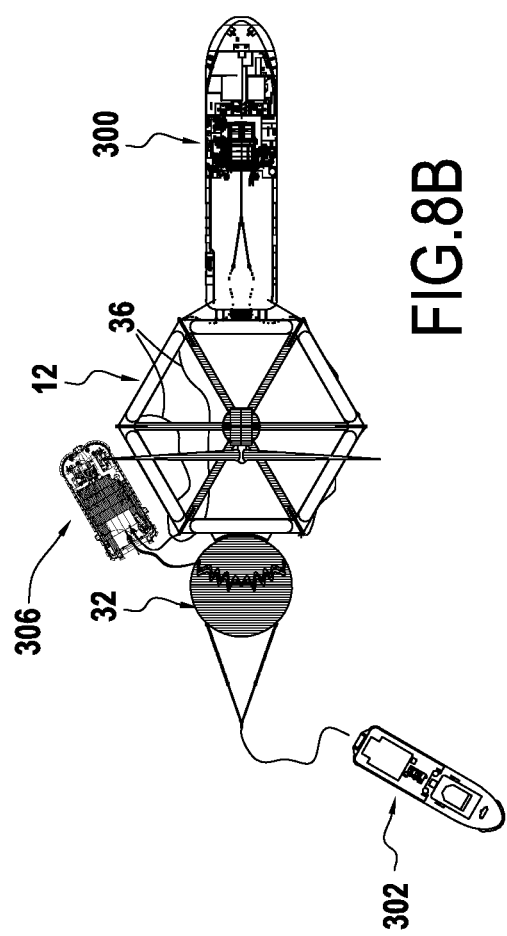

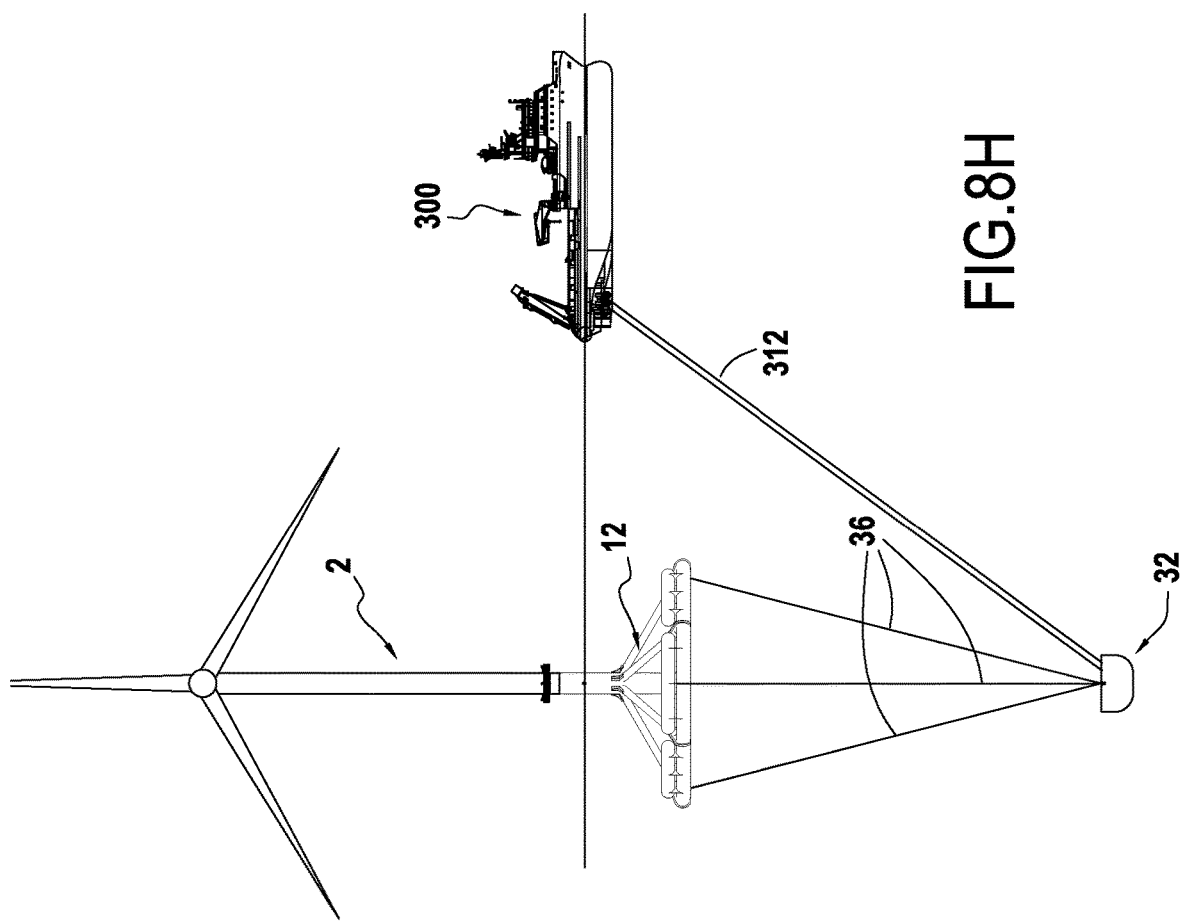
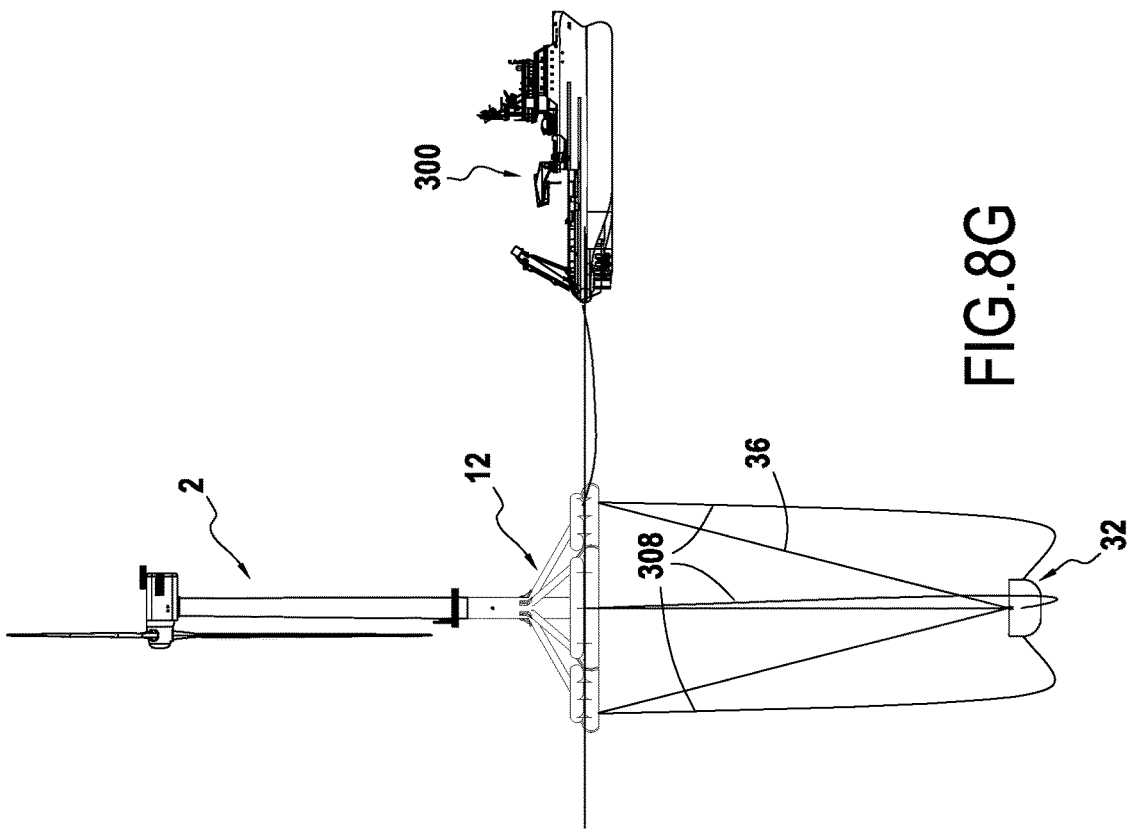

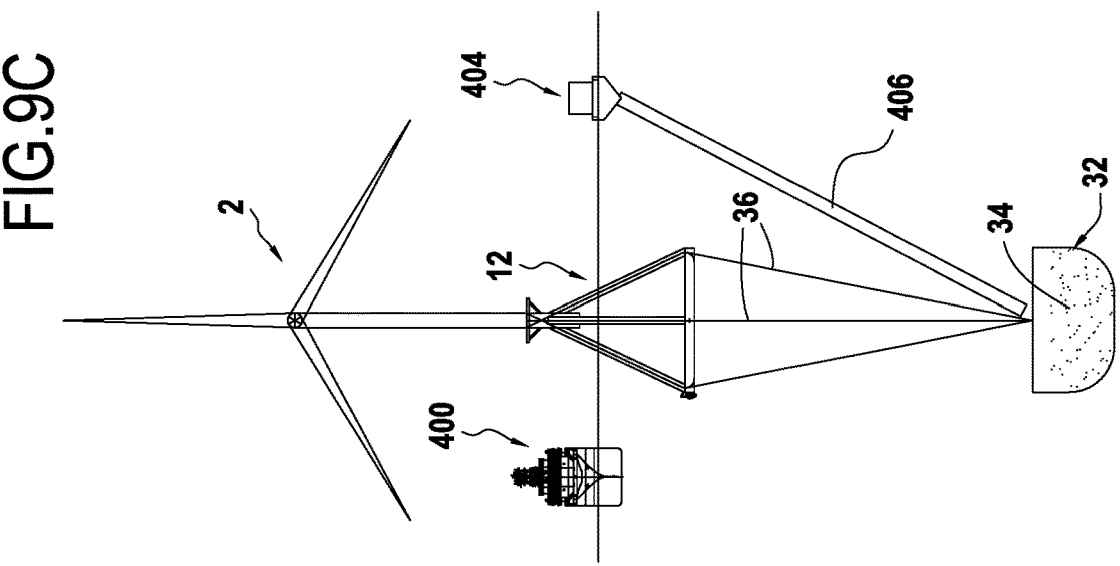
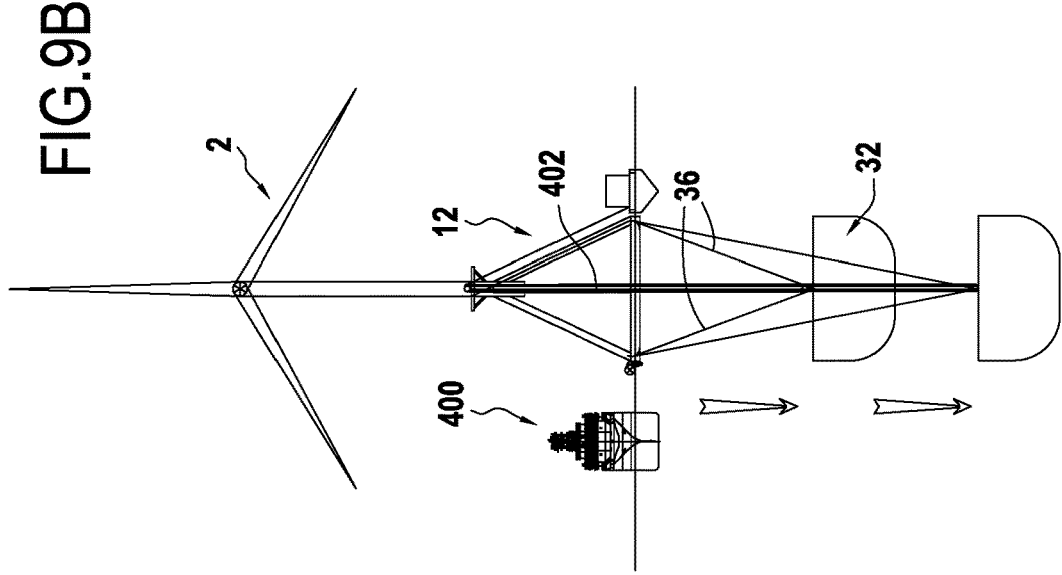
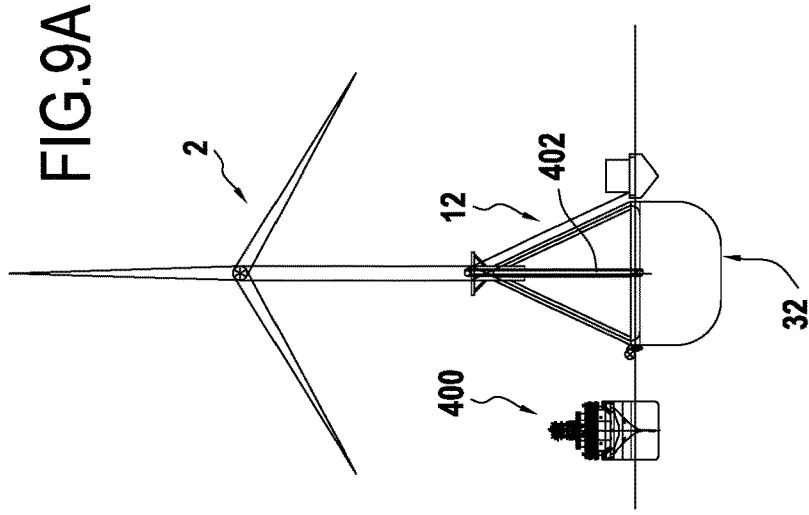

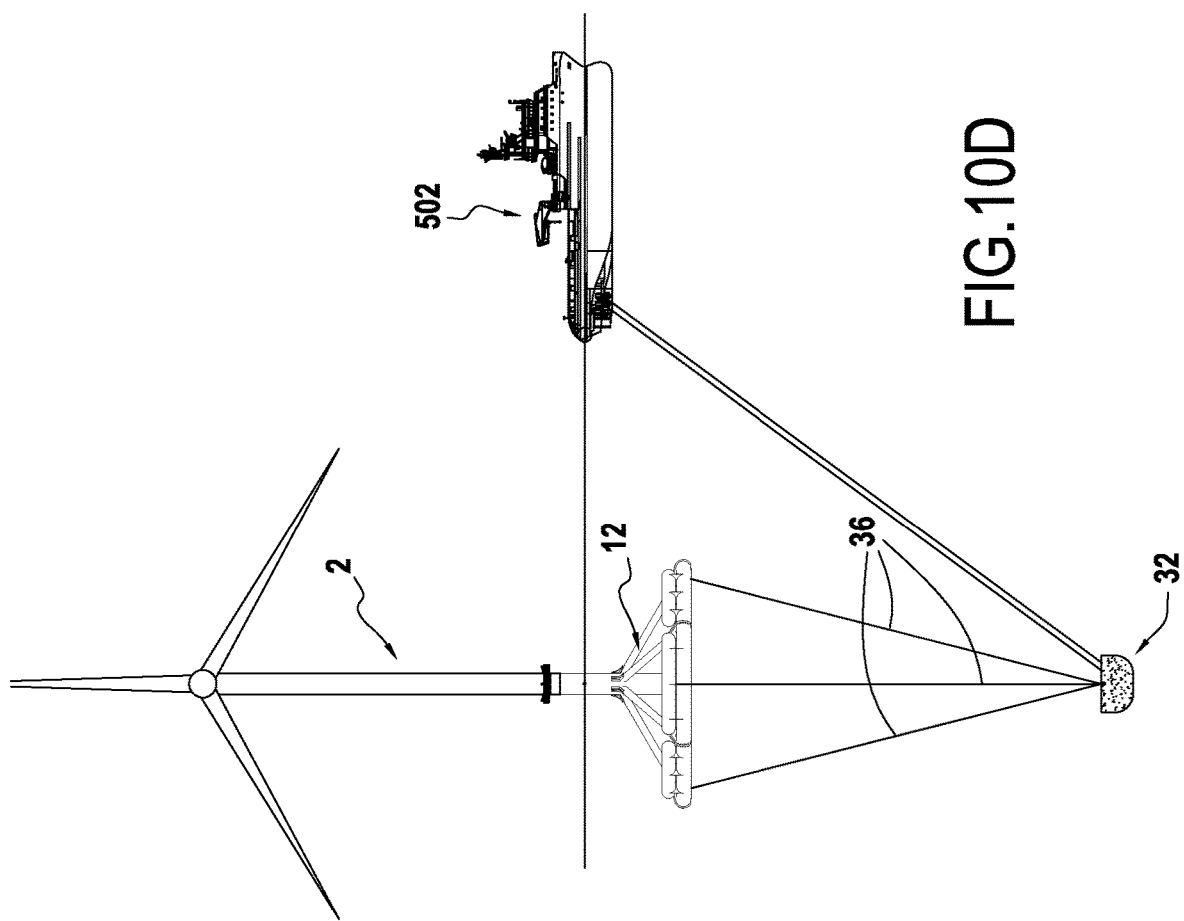
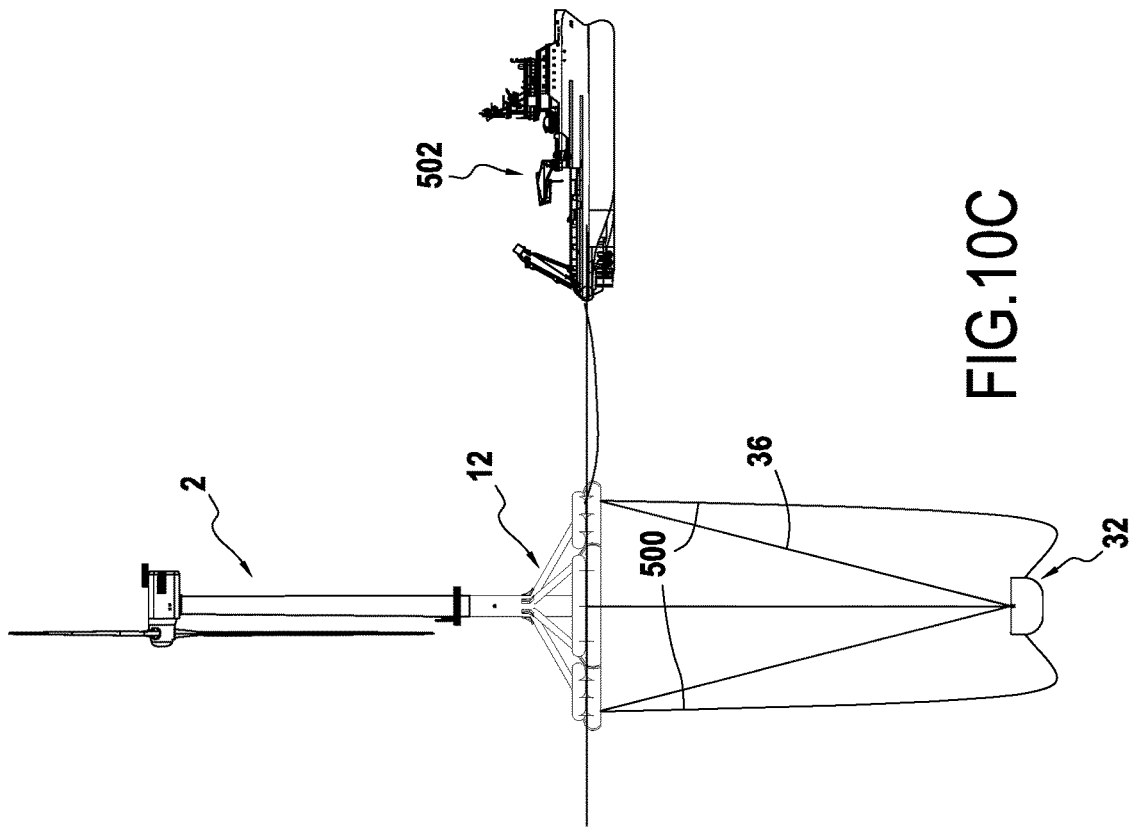
FIG.10D
FIG.10C

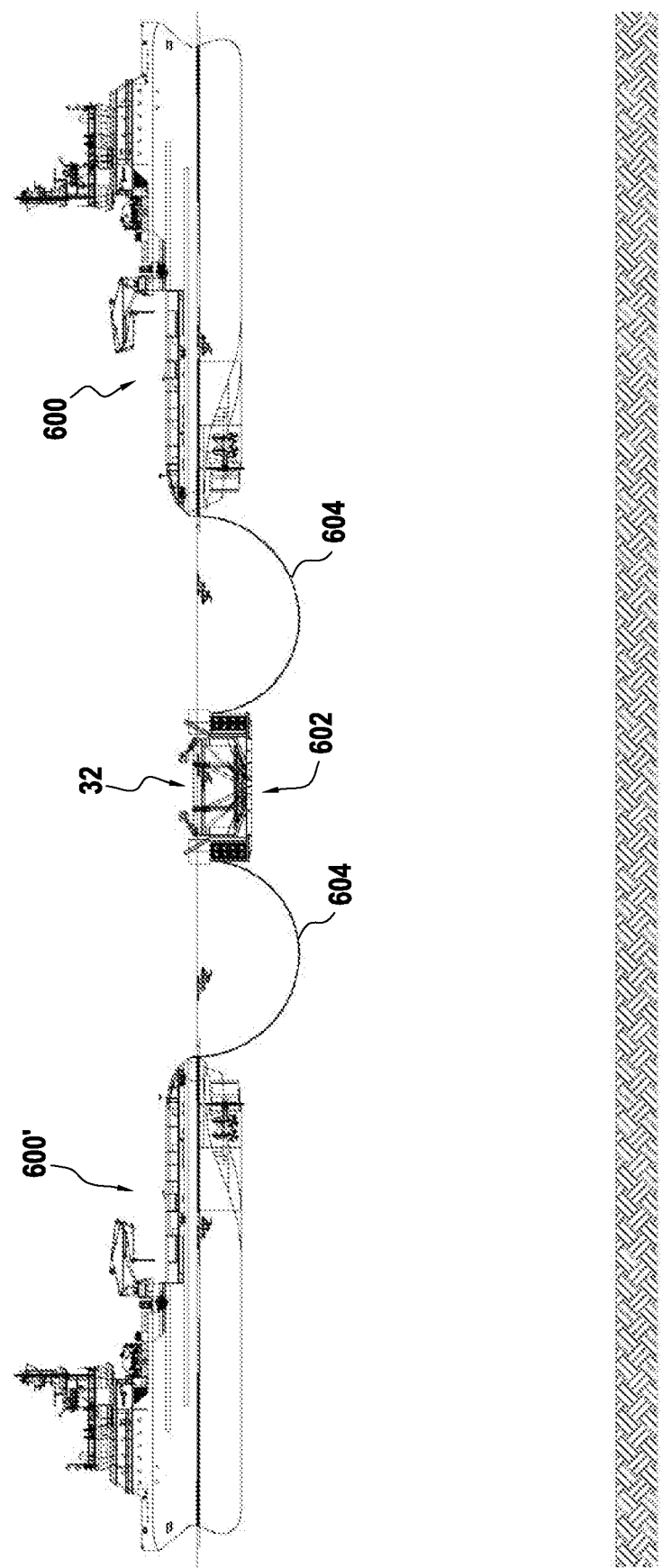

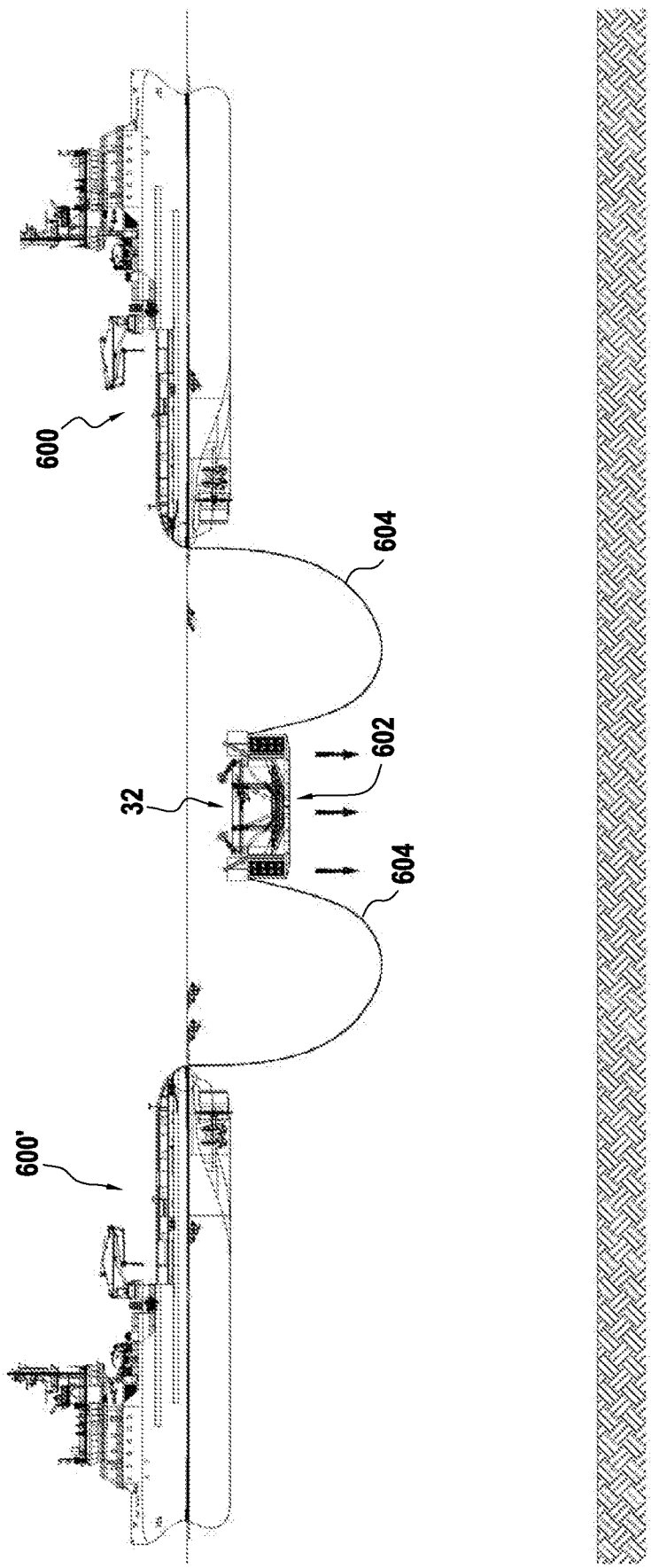

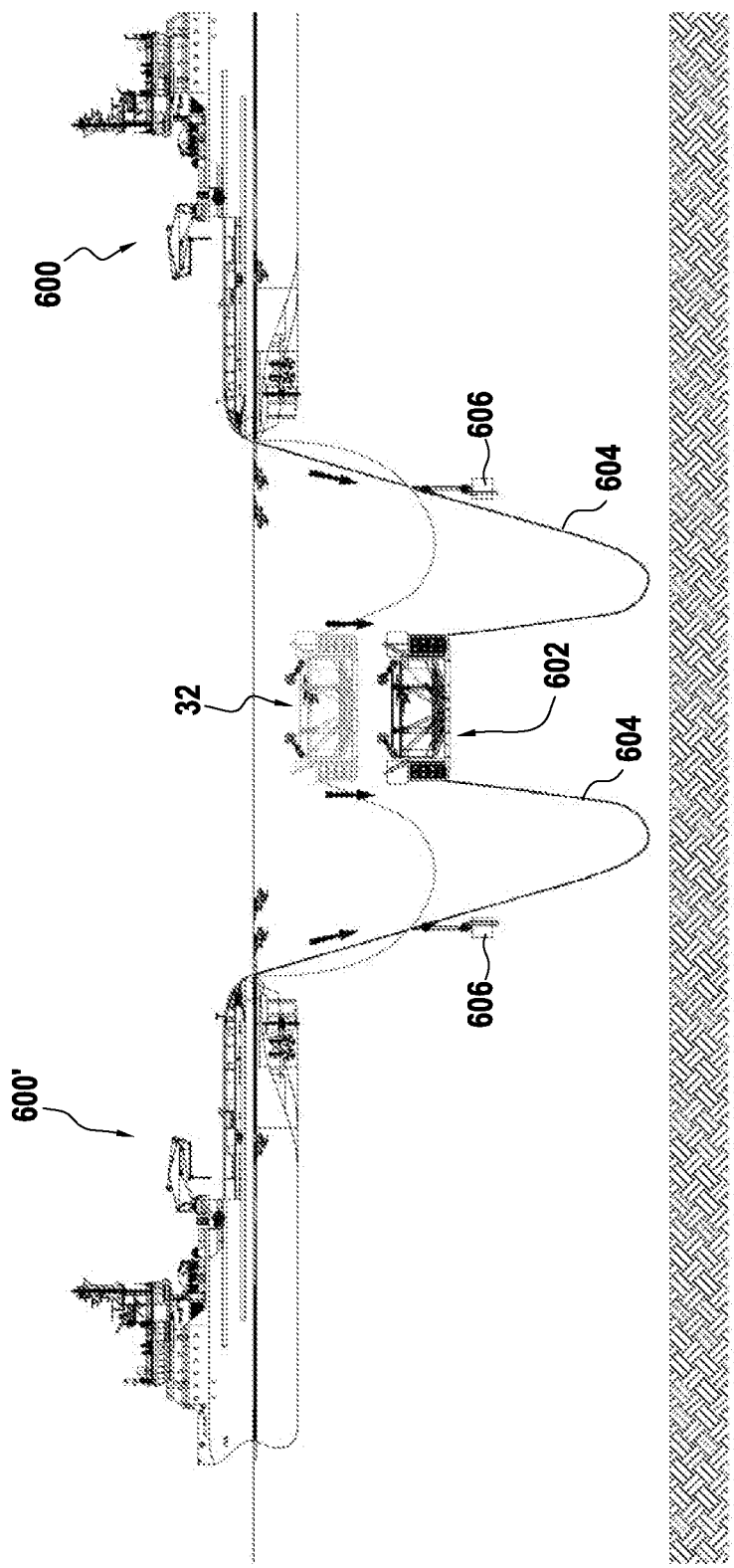

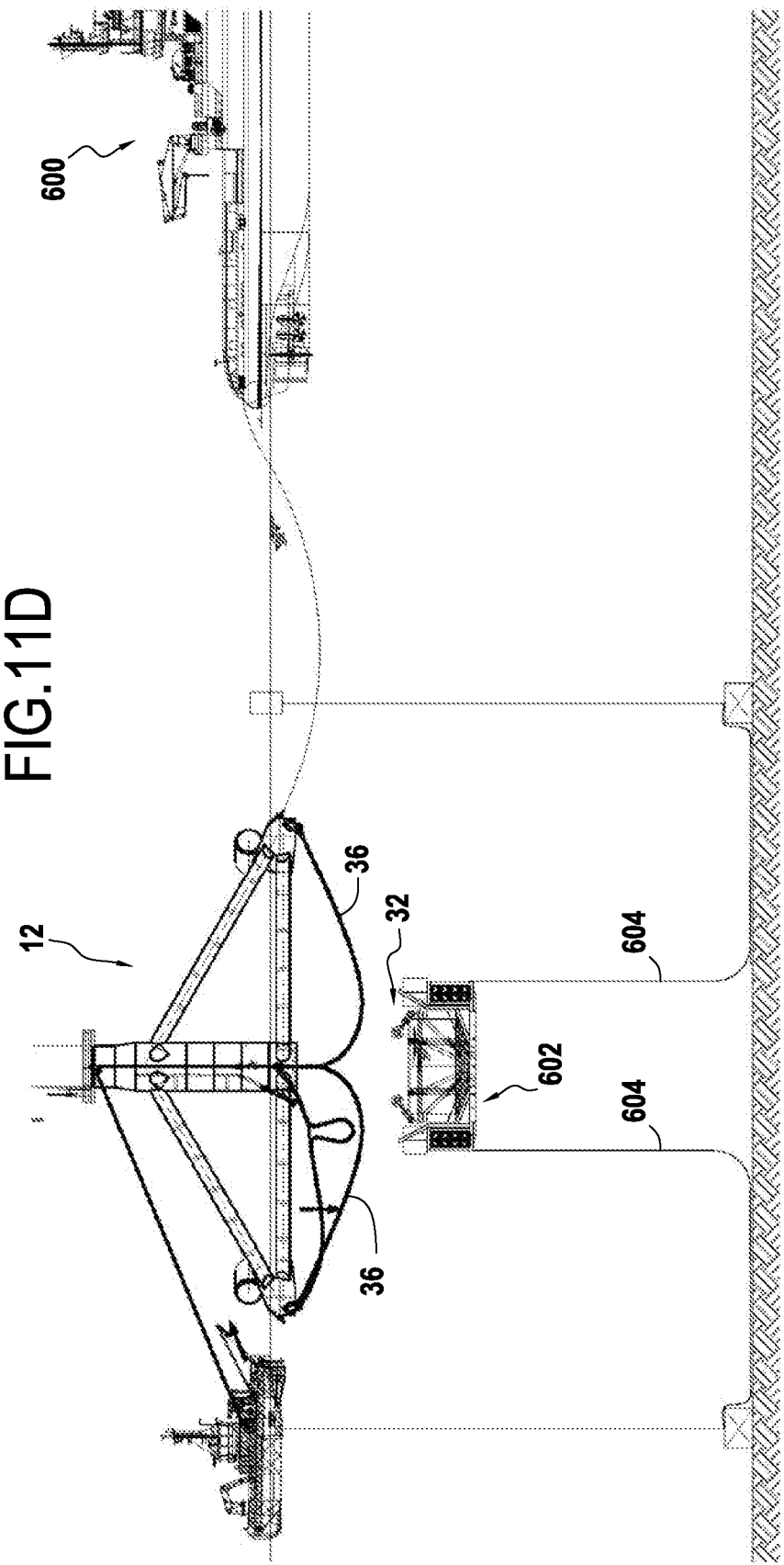

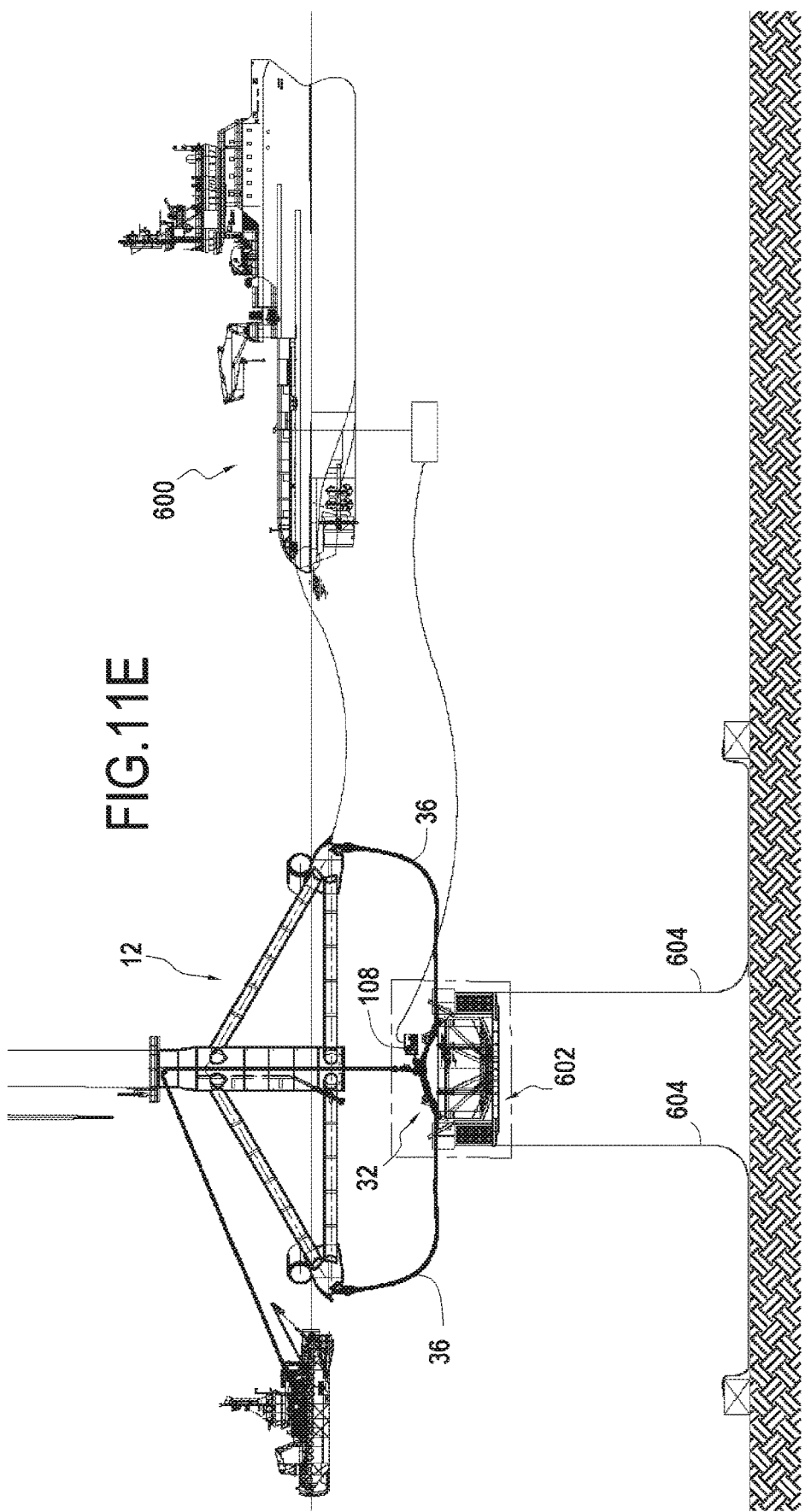

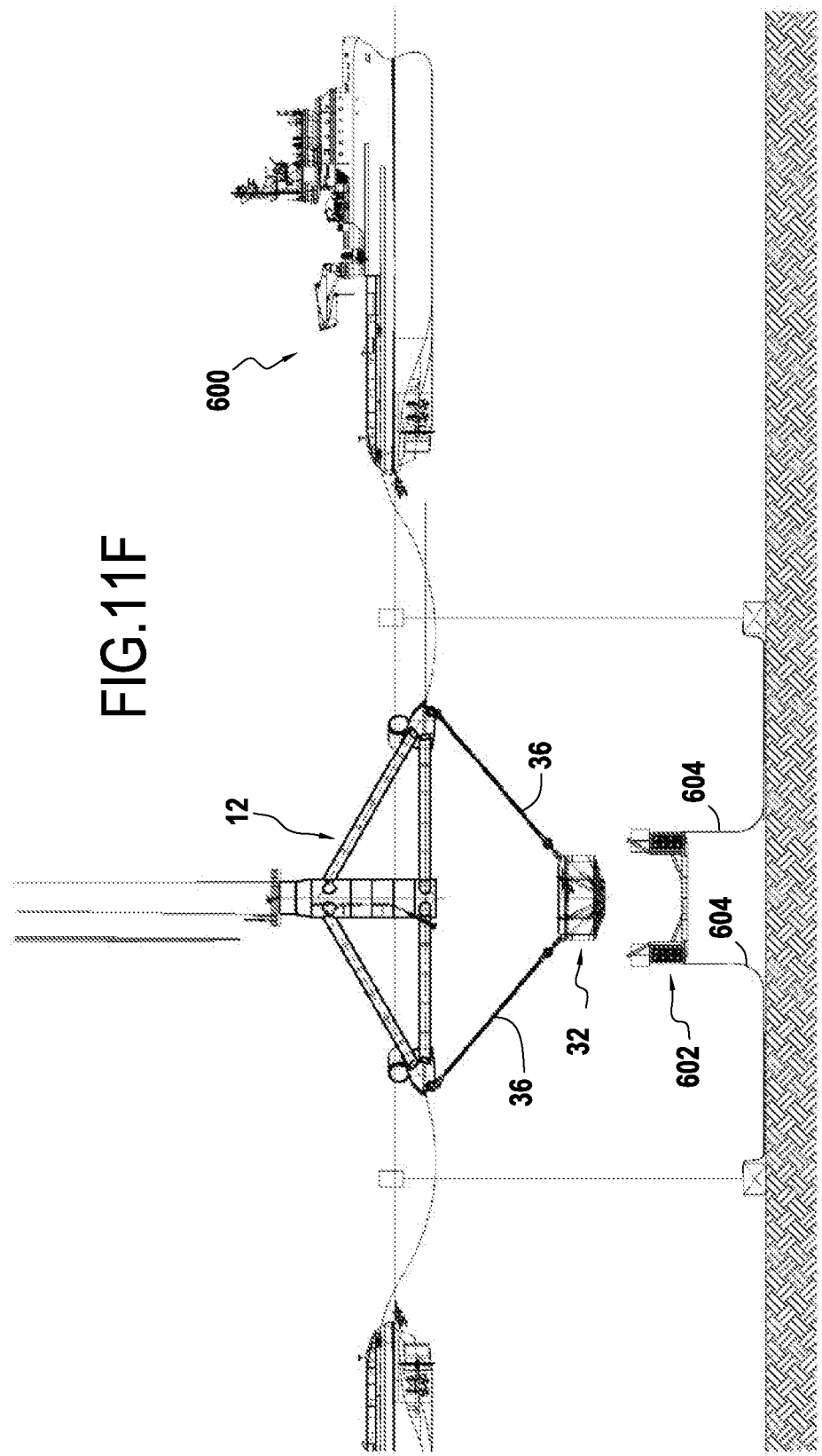

FLOATING SUPPORT STRUCTURE FOR OFFSHORE WIND TURBINE AND METHOD FOR INSTALLING A WIND TURBINE PROVIDED WITH SUCH A SUPPORT STRUCTURE

BACKGROUND OF THE INVENTION

The present invention relates to the general field of offshore wind turbines, that is to say implanted off the coast, and more particularly to floating support structures for floating offshore wind turbines. The invention also relates to a method for installing an offshore wind turbine provided with such a support structure.

An offshore wind turbine aims at using the energy of the wind in order to produce electricity by means of a turbine and an electric generator. There are two main types of offshore wind turbines: fixed wind turbines which are implanted on the seabed (at shallow depths typically less than 50 m), and the floating wind turbines which offer the advantage of being able to be built on land and implanted in areas where the depth of the seabed typically exceeds 50 m.

The floating wind turbines comprise a turbine generally formed by a motor having several rotary vanes with a horizontal axis and an electric generator coupled to the motor, the motor and the generator being fixed to an upper end of a vertical mast (or pylon). The lower end of the mast is for its part mounted on a floating support structure.

There are four main families of a floating support structure for an offshore wind turbine: barges, semi-submersible platforms, tension-leg platforms (or TLP platforms), and spar platforms, that is to say platforms with immersed foundation and stabilized ballast which are provided with catenary anchors making it possible to fix the wind turbine by attachment to the seabed. Among these families, the spar platforms have a relatively simple structure and rely on the use of widely proven manufacturing and installation technologies.

Reference may in particular be made to the publication WO 2005/021961 which describes an exemplary embodiment of a spar platform. The publication WO 2006/121337 gives the details of an anchoring system for such a spar platform, while the publication WO 2006/132539 relates to a method for installing this platform offshore.

The spar platforms, however, have a number of drawbacks which highly limit their usability in the offshore wind energy sector. For a high-power wind turbine, it is necessary, for installing the wind turbine, to have a minimum depth of the order of a hundred meters in order to deploy a spar platform. More generally, it is necessary to have a deep area with relatively calm sea conditions to manage the critical phases that are the turnover of the platform from the horizontal position to the vertical position, the ballasting of the platform, and the assembly of the turbine over the platform. In addition, resorting to spar platforms requires the use of large-capacity crane vessels which are rare and expensive to install the wind turbines on the offshore platforms. In addition, the spar platforms have a large drag in the water which limits the speeds of displacement of these platforms when they are towed.

These drawbacks of the spar platforms limit the implantation of wind turbines in areas having a fjord as a logistics base, which in practice is found in few places in the world, except in Norway. In addition, the costs achievable by platforms (due in particular to the very large amount of steel in light of the floatation needs) are limited to high values.

Furthermore, the stability of a floating wind turbine can be composed of a static stability problem and a dynamic stability problem. The problem of the dynamic stability stems from temporally non-constant forces that exert a destabilizing torque for the structure, inducing movements. These are related to wind speed fluctuations on the wind turbine or to waves. The energy of the waves is mainly concentrated in the first few meters from sea below the free surface. The floating support structures located mainly close to the free surface such as barges or semi-submersible platforms are highly subjected to the waves, so that these structures are generally affected by dynamic stability problems.

OBJECT AND SUMMARY OF THE INVENTION

The main object of the present invention is therefore to propose a floating support structure for an offshore wind turbine which does not have the aforementioned drawbacks.

This object is achieved thanks to a floating support structure for an offshore wind turbine, comprising a float intended to be partly immersed and on which a wind turbine mast is intended to be assembled, and a counterweight connected to the float and intended to be immersed under the float, and in which, according to the invention, the float comprises a toroid or polygon-shaped main structure with at least five sides which is formed by at least one tube intended to be immersed, a central tubular structure having a diameter adapted to receive the mast of the wind turbine and comprising a section able to be ballasted in order to adjust the waterline of the float, a first series of horizontal struts evenly distributed about a vertical axis and connecting the main structure to the central structure, and a second series of oblique struts evenly distributed about a vertical axis and connecting the main structure to the central structure at an angle comprised between 15° and 60° with the horizontal struts; and the counterweight comprises a basket able to receive ballast material and ballast links connecting the basket to the main structure of the float at an angle comprised between 15° and 45° with the vertical axis.

The invention thus consists of two elements (the float and the counterweight) which are connected together by ballast links: the floating element is easy to transport, its draft during the construction and installation phase is low, and it is compact and installable by solutions from the conventional offshore industry, the mast of the wind turbine and the nacelle can be installed during the construction of the float.

The floating support structure according to the invention is remarkable in particular by the minimal structure of the float which has a shape of a bicycle wheel carried horizontally in which the buoyancy exerted thereon would be provided in part by the central tubular structure (corresponding to the hub of the wheel) and in part by the toroid or polygon-shaped structure (corresponding to the tire of the wheel).

Furthermore, the particular shape of the main structure of the float makes it possible to obtain buoyancy which is continuously distributed about the vertical axis, and not punctual buoyancy. Likewise, this shape continuity makes it possible to prevent the stresses of the swell on the float from varying with the incidence variations, unlike a float which would be of punctual distribution.

In addition, such a structure makes it possible to resort to a float immersion depth which is typically comprised between 15 and 30 m. At such a depth, due to the shape continuity of the main float structure, the floating support structure is almost transparent to the effects of the swell and surface flows, which allows the wind turbine to overcome the maximum dynamic stability problems. More generally, the wind turbine using such a floating support structure can be implanted in economically accessible areas because a minimum water depth of the order of 70 m will suffice.

In this way, the floating support structure according to the invention allows the exploitation of the wind power for electricity production purposes by water depths greater than 70 m, without any upper limit of water depth. The wind turbine using such a floating support structure can therefore be implanted in economically accessible areas.

The floating support structure according to the invention makes it possible to obtain increased stability in rotation at the level of the wind turbine, both in movement and in acceleration. The mass of materials for the manufacture of this support structure is relatively low, which reduces the manufacturing costs. This floating support structure is also compatible with all current designs of floating wind turbines, with rated power up to 9.5 MW. The structure remains compatible with future wind turbines with a power from 10 to 15 MW and more which should go into production in the coming years.

The structure according to the invention provides great stability to the supported wind turbine both in the amplitude in rotational movements and in the angular accelerations. This stability relating to the swell, wind and flow conditions encountered in different regions of the world remains compatible with the technical specifications of wind turbines in the offshore wind power industry.

The structure according to the invention requires minimized tension levels in the anchor lines retaining the wind turbine. In addition, it is compatible with industry standard export power cable designs. It minimizes the surface coverage on the free surface, does not physically interfere with the navigation of small vessels in the immediate vicinity, and minimizes the mass of structural materials used by the floating support structures of wind turbines.

The manufacture of the structure according to the invention can be carried out in the various structural materials. It preferably uses metallic materials and standard manufacturing methods from the offshore structure construction industry. The structure according to the invention can also implement non-metallic materials at the level of the tendons and of the anchoring system which are in the range of the current standard capacities of the industry.

In addition, the dimensions, weight and draft of the floating support structure are compatible with most industrial ports and allow the assembly of the elements of the wind turbine on the support structure moored alongside the dock. The assembly of the support structure and of the wind turbine can be towed by floatation in sea conditions compatible with most regions of the world. These operations can be done safely with conditions of acceptable operational risks by using conventional installation means of the industry. Alternatively, the assembly of the floating support structure and of the wind turbine can be done at sea.

In order to have a floating support structure which is stable by weight and not by shape, the point of action of buoyancy should be located above its center of gravity. The center of gravity of a wind turbine being located quite high at the level of the mast, due to the weight of the nacelle and of the vanes, a counterweight should be added at the bottom of the support structure. This counterweight will apply a resisting torque at the level of the support structure.

Preferably, the ballast links form an angle $\beta$ with the vertical axis given by the following equation: $\beta = \arctan[(Dc/2 + Lh + Df)/(P - Te - Ep - Gp)]$; wherein: P is the water depth; Te is the draft measured at the bottom of the main structure; Ep is the thickness of the basket; Gp is the distance between the bottom of the basket and the seabed; Dc is the diameter of the central tubular structure; Lh is the length of the horizontal struts; and Df is the diameter of the tubes of the main structure.

Also preferably, the counterweight comprises a plurality of baskets each able to receive a ballast material and positioned vertically below each other while being evenly spaced apart.

More preferably, the oblique struts form an angle of 30° with the horizontal struts.

More preferably, the float further comprises an additional floatability structure formed by an assembly of additional floats mounted on the tube of the main structure.

Still preferably, when the main structure of the float is formed by an assembly of a plurality of tubes, these are connected together by means of junction plates welded to the ends of the tubes.

The invention also relates to a first embodiment of a method for installing an offshore wind turbine provided with a floating support structure as defined above, comprising the steps of:

transporting at sea an empty basket of the counterweight of the floating support structure;

descending into the sea the empty basket of the counterweight on which temporary floatation modules have been previously fixed and mooring it to a deadman previously placed on the seabed;

activating the temporary floatation modules of the basket to allow it to be stabilized in mid-water vertically to the deadman;

towing at sea the float of the floating support structure up to the vertical of the empty basket of the counterweight;

connecting the main structure of the float to the empty basket of the counterweight by means of ballast links;

sinking the empty basket of the counterweight to allow its disconnection from the deadman;

filling the basket of the counterweight with ballast material in order to partially immerse the float; and towing at sea the float connected to the counterweight up to the area of implantation of the wind turbine.

According to a second embodiment of a method for installing an offshore wind turbine provided with a floating support structure as defined above, the method comprises the successive steps of:

transporting at sea and placing on the seabed an empty basket of the counterweight of the floating support structure;

filling the basket of the counterweight laid on the seabed with ballast material;

towing at sea the float of the floating support structure up to the vertical of the filled basket of the counterweight;

connecting at low tide the main structure of the float to the filled basket of the counterweight by means of ballast links;

tensioning the ballast links and releasing the basket of the counterweight by effect of the flood tide; and towing at sea the float connected to the counterweight up to the area of implantation of the wind turbine.

In this second embodiment, preferably temporary buoys can be connected to the basket of the counterweight to reduce the weight thereof upon detachment from the seabed.

In one variant, the basket of the counterweight can be placed on the seabed using a raising system on which the basket rests.

According to a third embodiment of a method for installing an offshore wind turbine provided with a support structure as defined above, the method comprises the successive steps of:

transporting at sea separately an empty and floating basket of the counterweight of the floating support structure and its float;

connecting ballast links and sinking chains between the basket and the float;

immersing the basket by gradually ballasting it and controlling its position by the catenary effect of the sinking chains to descend it into an equilibrium position under the float;

descending the basket under the float until the ballast links are stretched;

filling the basket of the counterweight with ballast material in order to partially immerse the float; and towing at sea the float connected to the counterweight up to the area of implantation of the wind turbine at sea.

According to a fourth embodiment of a method for installing an offshore wind turbine provided with a floating support structure as defined above, the method comprises the successive steps of:

transporting at sea jointly a basket of the counterweight positioned under the floating support structure and its float;

vertically descending the basket by means of a lifting system preferably integrated at the level of the float;

towing at sea the float connected to the counterweight up to the area of implantation of the wind turbine; and filling with ballast material the basket of the counterweight suspended from the structure of the float.

According to a fifth embodiment of a method for installing an offshore wind turbine provided with a floating support structure as defined above, the method comprises the successive steps of:

connecting ballast links and sinking chains between the basket of the counterweight and the float;

towing at sea jointly the float connected to the counterweight positioned under the floating support structure up to the area of implantation of the wind turbine;

immersing the basket by gradually ballasting it and controlling its position by the catenary effect of the sinking chains to descend it into an equilibrium position under the float;

descending the basket under the float until the ballast links are stretched;

filling the basket of the counterweight with ballast material in order to immerse the float.

According to a sixth embodiment of a method for installing an offshore wind turbine provided with a floating support structure as defined above, the method comprises the successive steps of:

transporting at sea a basket of the counterweight of the floating support structure positioned in a submersible floating support structure filled with air;

descending into the sea the submersible floating support structure (602) by a system of ballast chains attached thereto;

towing at sea the float vertically to the counterweight basket, the ballast links having been previously connected to the float;

connecting the ballast links to the basket of the counterweight;

gradually filling the submersible floating support structure in order to make it lose floatability until the ballast links are tensioned and the submersible floating support structure disengages completely from the counterweight basket;

towing at sea the float connected to the counterweight up to the area of implantation of the wind turbine; and mooring the float connected to the counterweight on the area of implantation of the wind turbine.

The counterweight basket can be transported at sea with a basket previously filled with ballast material. Alternatively, the counterweight basket can be transported at sea with a basket lightly filled with ballast material, the rest of the ballast material filling the basket once the wind turbine and its counterweight have been towed over the implantation area.

BRIEF DESCRIPTION OF THE DRAWINGS

Other characteristics and advantages of the present invention will emerge from the description given below, with reference to the appended drawings which illustrate exemplary embodiments thereof without any limitation. In the figures:

FIGS. 7A to 7K illustrate the different steps of a method for installing an offshore wind turbine provided with a floating support structure according to a second embodiment of the invention; and FIGS. 8A to 8H illustrate the different steps of a method for installing an offshore wind turbine provided with a floating support structure according to a third embodiment of the invention;

FIGS. 9A to 9C illustrate the different steps of a method for installing an offshore wind turbine provided with a floating support structure according to a fourth embodiment of the invention;

FIGS. 10A to 10D illustrate the different steps of a method for installing an offshore wind turbine provided with a floating support structure according to a fifth embodiment of the invention; and FIGS. 11A to 11F illustrate the different steps of a method for installing an offshore wind turbine provided with a floating support structure according to a sixth embodiment of the invention.

DETAILED DESCRIPTION OF THE INVENTION

Figure 1:
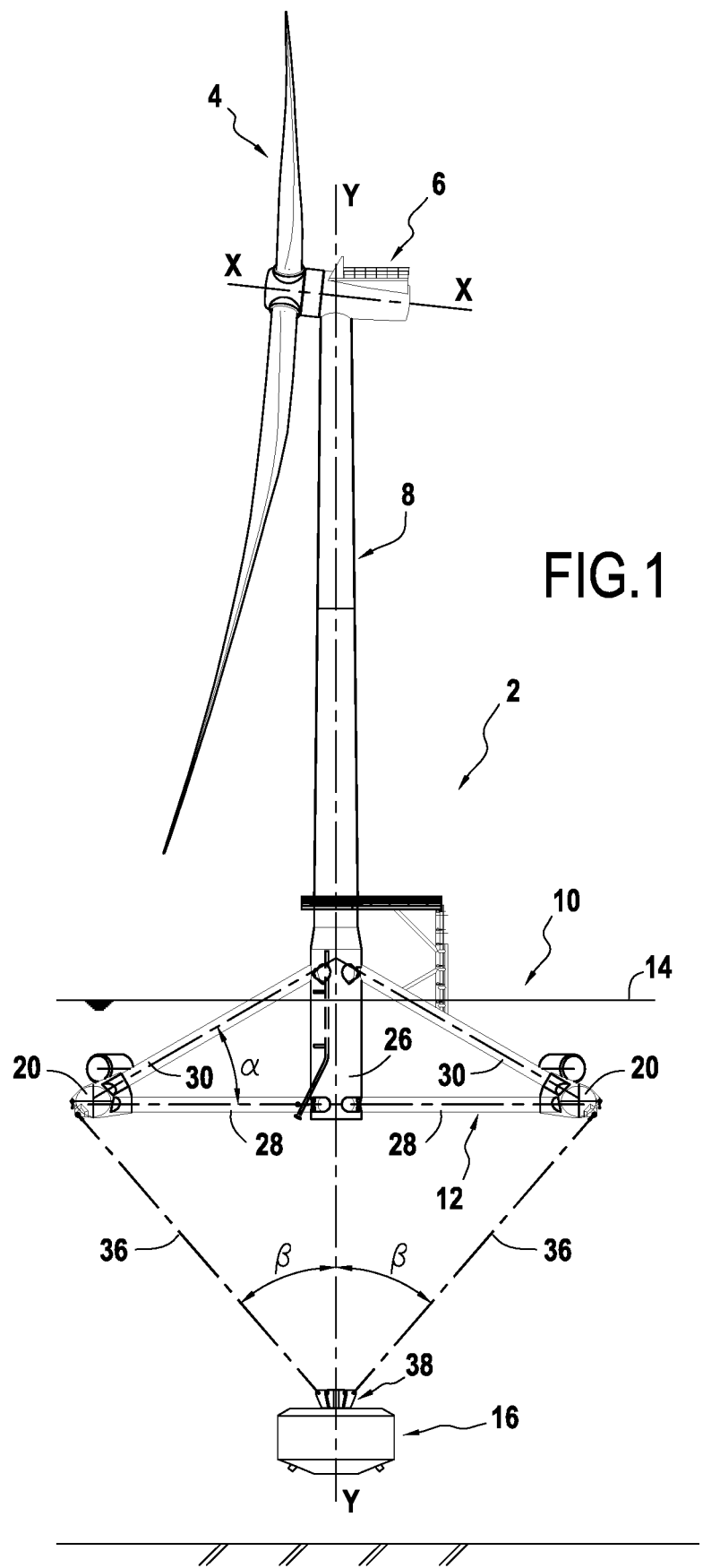
FIG. 1 is a side view of an offshore wind turbine mounted on a floating support structure according to the invention.

FIG. 1 represents, in side view, a floating offshore wind turbine 2 implanted at sea off the coast.

In known manner, such a wind turbine 2 comprises a turbine 4 generally formed by a motor having several rotary vanes with a substantially horizontal axis X-X, and an electric generator 6 coupled to the motor, the motor and the generator being fixed to an upper end of a vertical mast 8 (or pylon). The lower end of the mast 8 is for its part mounted on a floating support structure 10 according to the invention.

According to the invention, the floating support structure 10 consists of a float 12 which is intended to be partly immersed (the sea level is symbolized in FIG. 1 by the line 14) and of a counterweight 16 which is connected to the float 12 and which is intended to be immersed under it. The lower end of the mast 8 of the wind turbine is assembled on the float 12 of the floating support structure.

Figure 2:
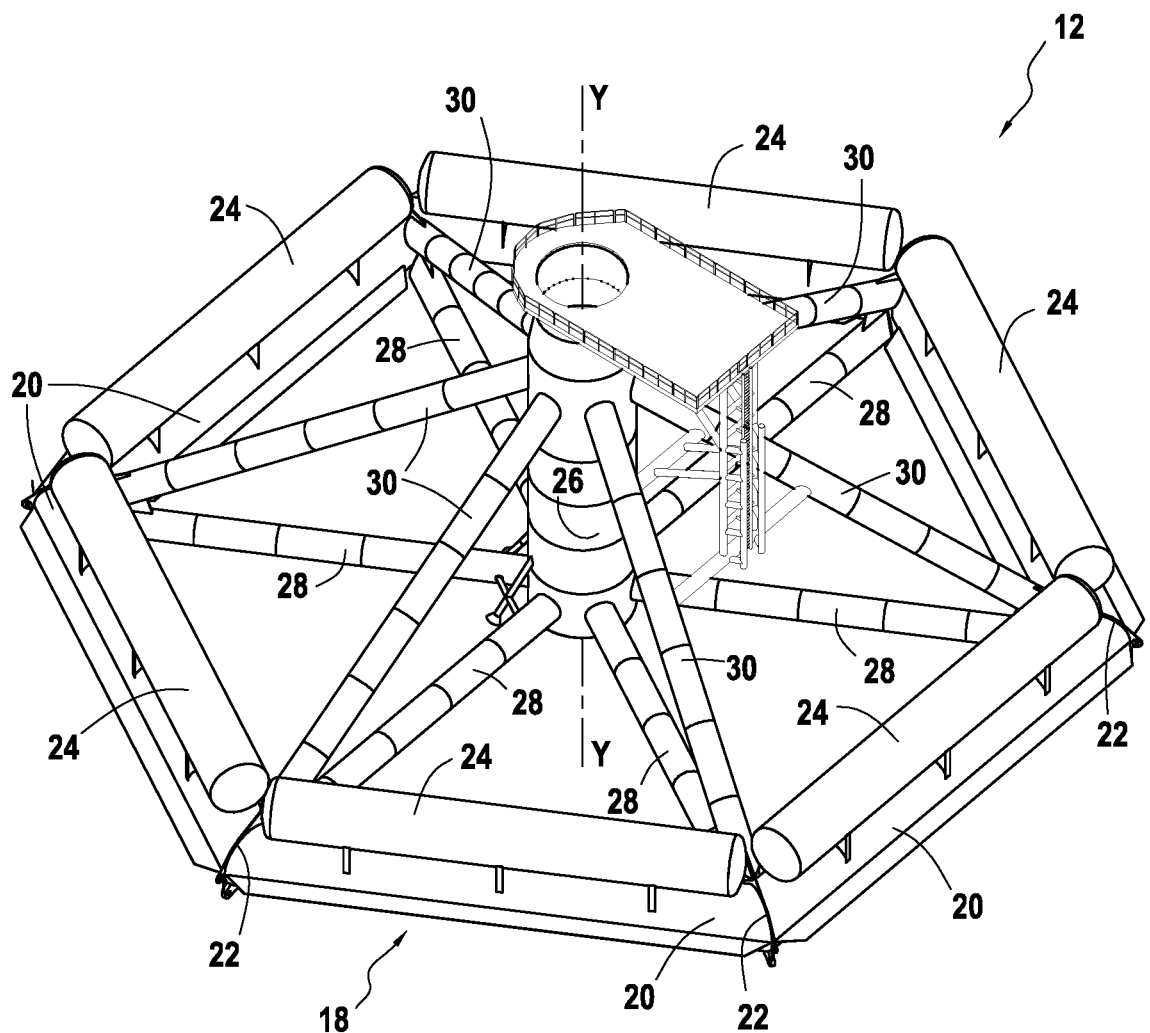
FIG. 2 is a perspective view of the float of the floating support structure of FIG. 1.

As represented in FIG. 2, the float 12 comprises a polygon-shaped main structure 18 with at least five sides, this polygon-shaped main structure being formed by an assembly of tubes 20 with circular section intended to be immersed. Alternatively, the main structure has a toric shape. In this variant, it is formed by a single tube with circular section.

In the example illustrated in these figures, the main structure 18 of the float has a polygonal shape with six sides. Such a hexagonal shape represents the preferred embodiment. Indeed, this shape offers the best compromise in terms of structure and hydrodynamic behavior.

The tubes 20 of the main structure of the float are of circular section and are connected together by means of junction plates 22 which are welded to the ends of the tubes. These tubes 20 are stiffened by a system of crossed stiffeners (not represented in the figures) making it possible to optimize the weight of the structure subjected to the hydrostatic pressure. The tubes are compartmentalized so that the stability of the system is not jeopardized if one of these compartments is filled with seawater.

Furthermore, the main structure 18 of the float further comprises an additional floatability structure formed by an assembly of additional floats 24 which are mounted on the tubes 20 and which allow raising the freeboard of the float and wind turbine assembly in the towing phases in order to improve stability. These additional floats can be collected after the towing phase or left on the float after its immersion.

The float 12 also comprises a central tubular structure 26 centered on a vertical axis Y-Y and having a diameter adapted to receive the mast 8 of the wind turbine. This central structure 26 comprises a section (not represented in the figures) which is able to be ballasted with sea water in order to adjust the waterline of the float to the desired immersion depth.

The float 12 further comprises a first series of horizontal struts 28 which are evenly distributed about the vertical axis Y-Y and which connect each end of the tubes 20 of the main structure to the central structure 26, and more particularly to the lower part thereof. There are as many horizontal struts 28 as there are tubes 20 forming the main structure.

This structure of horizontal struts 28, of the cross-linked type, although very simple, makes it possible to reduce the bending moments in the tubes 20 of the main structure at secondary moments. This allows optimizing the working mode of the tubes in traction and compression.

The float 12 also comprises a second series of oblique struts 30 which are also evenly distributed about the vertical axis Y-Y and which connect each end of the tubes 20 of the main structure to the central structure, and more particularly to the upper part thereof, at an angle α comprised between 15° and 60°—and preferably equal to 30°—with the horizontal struts 28. As for the horizontal struts, there are as many oblique struts 30 as there are tubes 20 forming the main structure.

The horizontal 28 and oblique 30 struts are in the form of tubes. The connection between the struts and the main structure of the float is made at the junction plates 22. This assembly technique makes it easier to adjust and weld the large-dimensioned struts.

Figure 3:
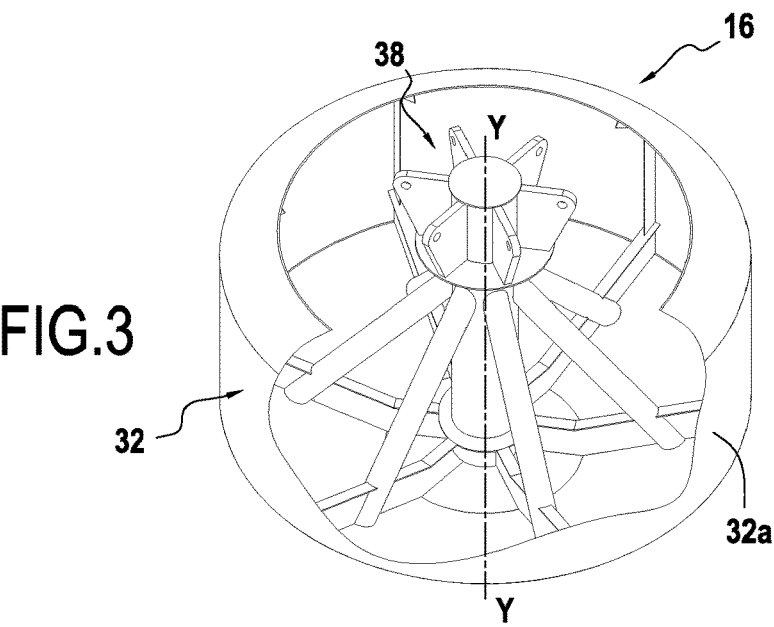
FIG. 3 is a perspective cutaway view of a basket of the floating support structure of FIG. 1.
Figure 5:
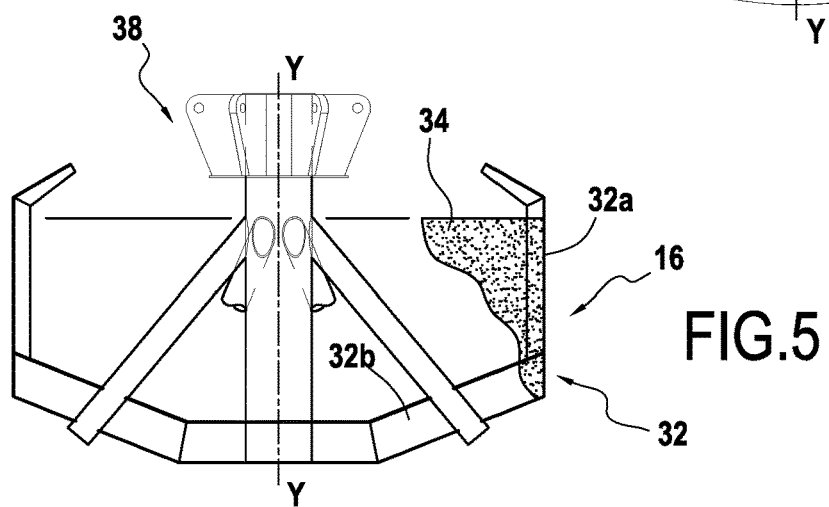
FIG. 5 is a sectional view along V-V of FIG. 4.
Figure 4:
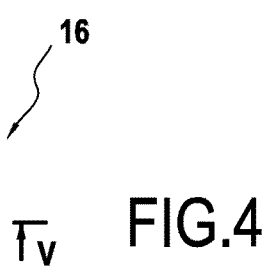
FIG. 4 is a top view of the basket of FIG. 4.

Furthermore, as represented in FIGS. 3 to 5, the counterweight 16 of the floating support structure according to the invention comprises a basket 32 which is able to receive a ballast material 34.

In order to provide a large mass counterweight while reducing the costs, a heavy material that is both economical and compatible with the marine environment should be used. In a preferred embodiment, the best compromise for the ballast material 34 is found with heavy ballast materials. Typically, this ballasting material can be chemically stabilized magnetite in order to be made compatible with the environment. Alternatively, this ballast material can be filling material, sand, chilled iron shot or scrap metal.

In order to be able to support this ballasting material 34, the latter should be placed in a basket 32 designed to support the stresses. The diameter of the basket varies, depending on the application, typically between 8 m and 22 m and its height between 6 m and 10 m.

The basket 32 of the counterweight consists of a cylindrical shell 32a terminated by a domed or frustoconical bottom 32b in its lower part. The weight is taken by ballast links 36 (or tendons)—preferably six in number—connecting the basket to each end of the tubes 20 of the main structure.

More specifically, these ballast links 36 are gathered on a central cylindrical connector 38 which is located in the center of the cylindrical shell 32a of the basket in its upper part.

The central connector 38 makes it possible to concentrate the weight of the counterweight at a central point located in the axis of the central structure 26 of the float. This concentration of weight at one point is a key factor in the effectiveness of the counterweight system, it allows the sinker to remain stationary relative to the float regardless of the angle of inclination as long as the ballast links 36 remain all stretched.

As represented in FIG. 1, the ballast links 36 connecting the basket 32 to each end of the tubes 20 of the main structure form an angle β comprised between 15° and 45° with the vertical axis Y-Y.

The angle β formed by the ballast links 36 with the vertical axis is preferably given by the following equation:

$$\beta n = \arctan[(Dc/2 + Lh + Df)/(P - Te - Ep - Gp)]$$

wherein: P is the water depth; Te is the draft measured at the bottom of the main structure; Ep is the thickness of the basket; Gp is the distance between the bottom of the basket and the seabed; Dc is the diameter of the central structure; Lh is the length of the horizontal struts; and Df is the diameter of the tubes of the main structure.

The bottom of the float 12 of the floating support structure according to the invention is located at an immersion depth typically of 25 m. The minimum structure making it possible to take up tensile stresses are the ballast links 36. The counterweight is therefore attached to the float by as many ballast links as the main structure of the float has sides. At the level of this structure, the ballast links 36 are connected to the junction plates 22.

The ballast links 36 can be as light as possible because their mass plays only a marginal role in the stability of the floating support structure. They must also be capable of taking up the stresses generated by the weight of the counterweight and have minimal elasticity and deformation over time.

Also, in a preferred embodiment, these ballast links are rope assemblies made of synthetic materials having a low elongation (typically high-density polyethylene). These materials combine good mechanical properties with a negative weight in water (density of the material less than 1). Alternatively, these ballast links can be cables, chains or metal tubes.

The spacing of the attachment points of the ballast links 36 on the main structure 18 of the float is chosen so that when the inclination of the direction of the mast 8 of the wind turbine with the vertical axis Y-Y is maximum, all ballast links remain tensioned. The stresses to which the system is subjected are increased by a safety factor depending on the application case. In this way, the inclination of the wind turbine under the action of the resultant of the drag of the wind force and of the weight of the wind turbine causes a transfer of tension from the ballast links located in the opposite direction to the wind towards those located in the direction of the wind. The counterweight then remains in the axis of the mast of the wind turbine and this flexible structure behaves mechanically like a rigid structure, the sinker remaining fixed relative to the float. In other words, this pendulum structure achieves the counterweight function of a spar platform, while having a lighter structure, transparent to swell and installable with the wind turbine fixed on the float in the port.

The floating support structure according to the invention is designed so as to be stable without an anchoring system. The anchoring system therefore does not participate in the stability of the floating support structure. This creates much lower tension levels in the anchor lines and geotechnical constraints on the weakened anchors.

In connection with FIGS. 6A to 6Q, there will be described a method for installing, according to a first embodiment of the invention, an offshore wind turbine provided with a floating support structure as described above.

FIGS. 6A to 6H illustrate the different steps of preparation and installation on the seabed of the counterweight of the floating support structure according to the invention.

Figure 6C:
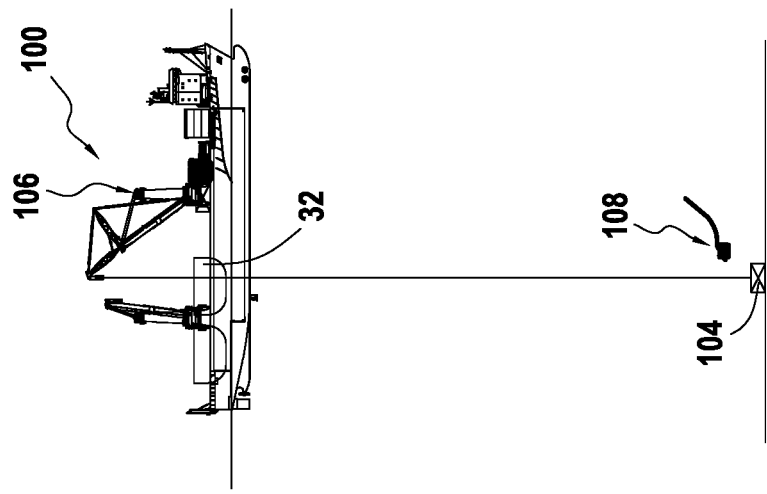
FIGS. 6A to 6Q illustrate the different steps of a method for installing an offshore wind turbine provided with a floating support structure according to a first embodiment of the invention.
Figure 6B:
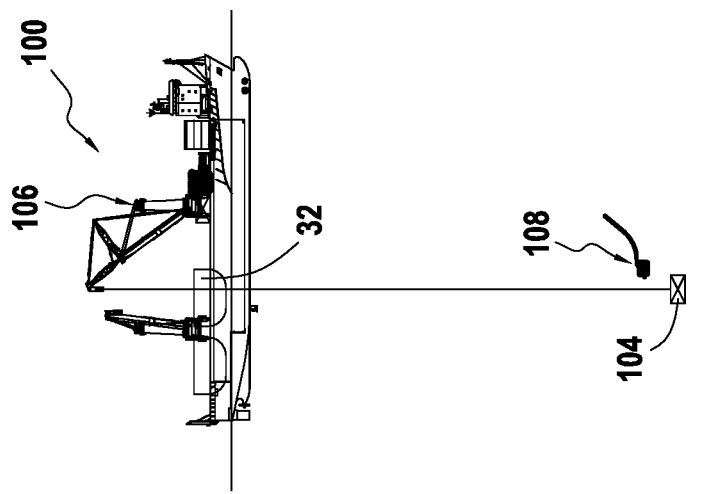
Figure 6A:
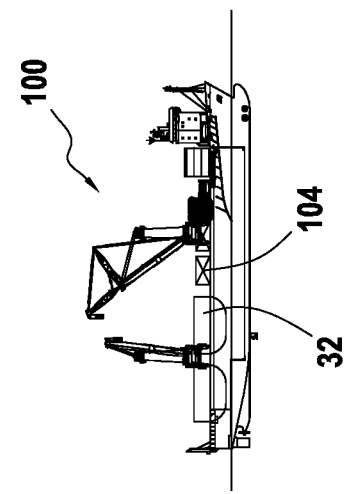

In FIG. 6A, a barge 100 transporting in particular the basket 32 of the counterweight of the floating support structure and a deadman 104 is brought into sea on site. The deadman 104 is then descended into sea vertically to the barge 100 by a crane 106 (FIG. 6B) and then placed on the seabed (FIG. 6C).

Figure 6F:
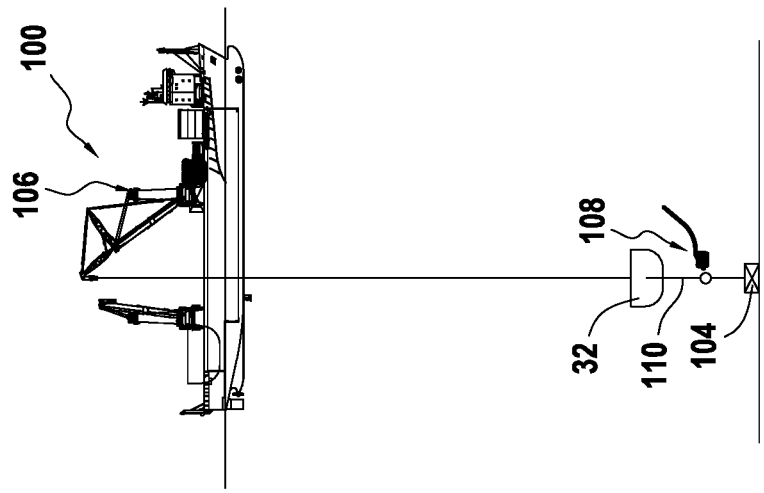
Figure 6E:
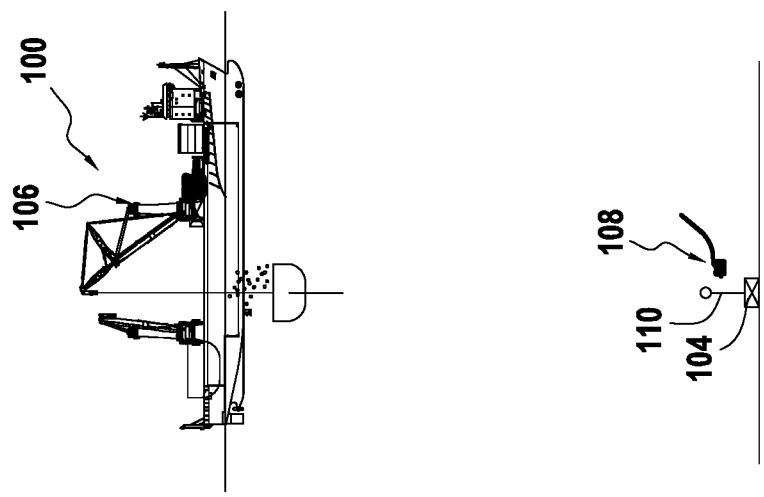
Figure 6D:
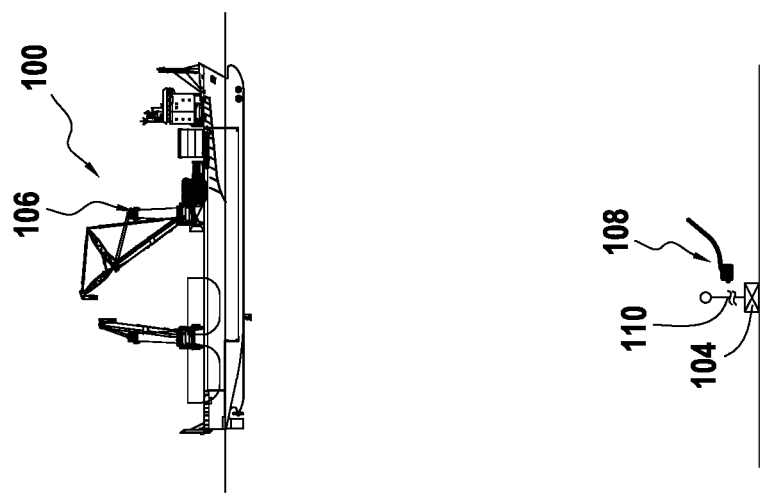

A remotely operated vehicle 108 (also called ROV) to supervise these operations and then to install a buoy rope 110 on the deadman 104 is represented in FIG. 6D. Here, the buoy rope 110 is a rope connected to a temporary buoy on the one hand and to a deadman 104 on the other hand, in order to provide a point of attachment to the deadman above the seabed and below the final depth of the sinker basket.

During the next step represented in FIG. 6E, the (empty) basket 32 of the counterweight of the floating support structure is also descended by the crane 106 from the barge towards the seabed to be connected to the buoy rope 110 under the control of the ROV 108 (FIG. 6F). Floatation modules 112 (three in number in the figures) previously filled with air are then descended into the sea from the barge and fixed on the basket 32 of the counterweight (FIG. 6G). At the end of this step, this coupling is disconnected from the barge 100 and the ROV 108 is lifted on board the latter (FIG. 6H).

Figure 6L:
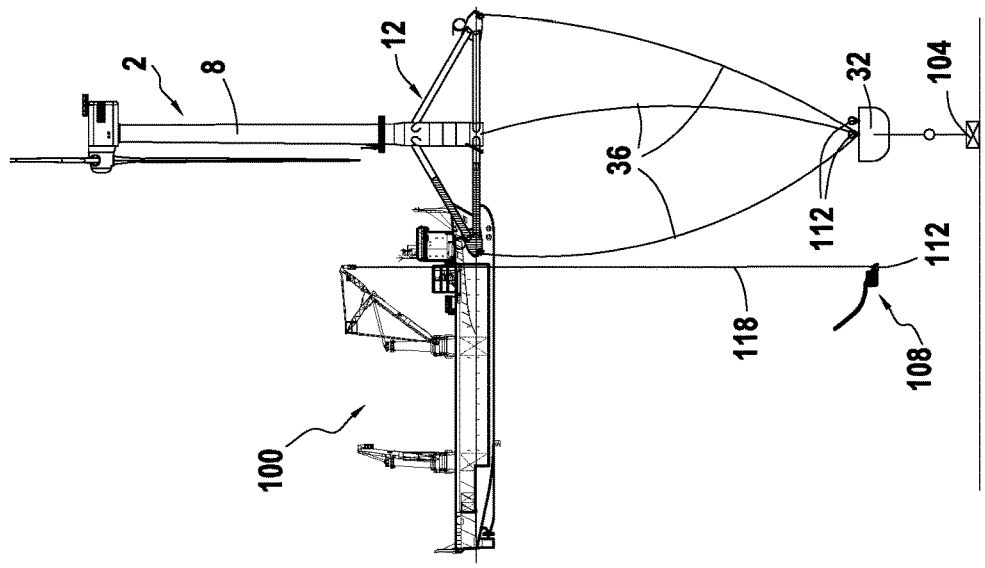
Figure 6K:
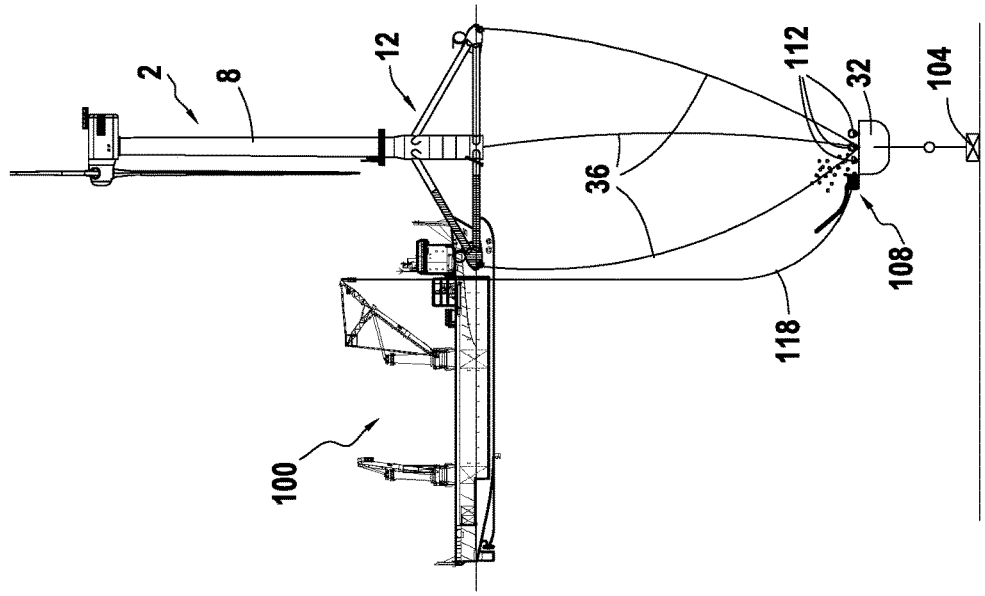
Figure 6J:
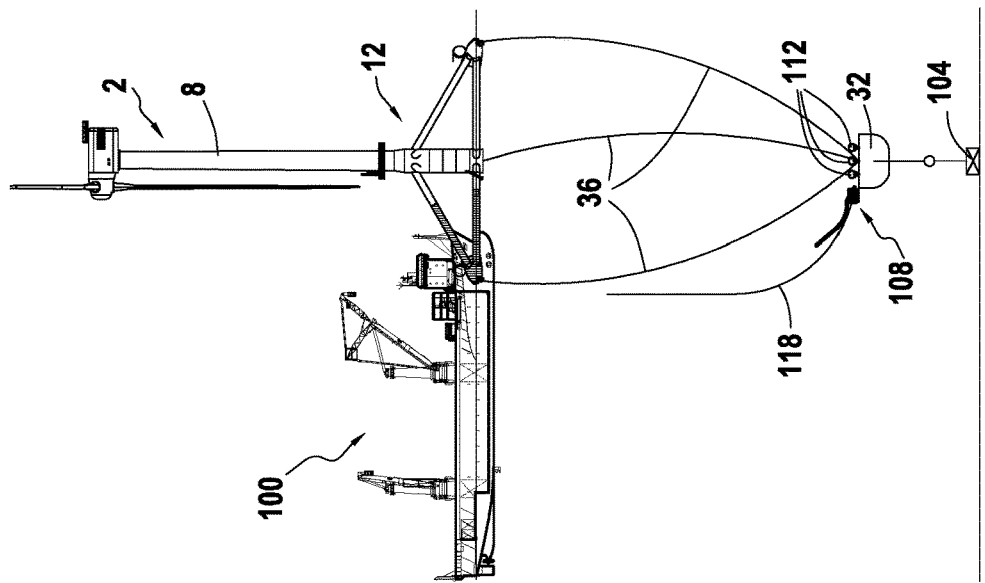

As illustrated in FIGS. 6I and 6J, the float 12 of the floating support structure on which the mast 8 of a wind turbine 2 has previously been mounted is then towed by a tug 114 vertically to the basket 32 of the counterweight moored to the deadman 104. This towing can be carried out by means of a tug connected to the main structure 18 of the float by one or more towing cables 116.

When the float 12 and the wind turbine 2 are vertical to the basket 32 of the counterweight, the ROV 108 is again deployed to connect the main structure of the float to the basket by means of the ballast links 36 (FIG. 6J). In order to allow stabilizing the position of the float 12 above the basket of the counterweight, it may be necessary to resort to several tugs evenly spaced therearound.

During the next step represented in FIG. 6K, the air present inside the floatation modules 112 is then released (and replaced by sea water). The ROV 108 can then be controlled to detach one after the other each floatation module emptied of its air to lift it in the barge 100 by means of a rope 118 of the crane 106 (FIG. 6L).

Once the floatation modules have been removed, the basket 32 of the counterweight acts on the ballast links 36 to stretch them and the buoy rope 110 is for its part loosened (FIG. 6M). The buoy rope 110 can thus be easily disconnected from the basket of the counterweight by the ROV 108 (FIG. 6N). The float 12 and the wind turbine with the basket 32 of the counterweight connected by the ballast links are then towed by the tug 114 up to the area of implantation of the wind turbine at sea (FIG. 6O).

Once the float 12 and the wind turbine 2 are positioned and kept vertical to the chosen implantation area, a barge 120 fills the basket 32 of the counterweight with the ballasting material 34. This operation can be carried out using a tube 122 connecting the basket to the barge 120 (FIG. 6P).

Figure 6Q:
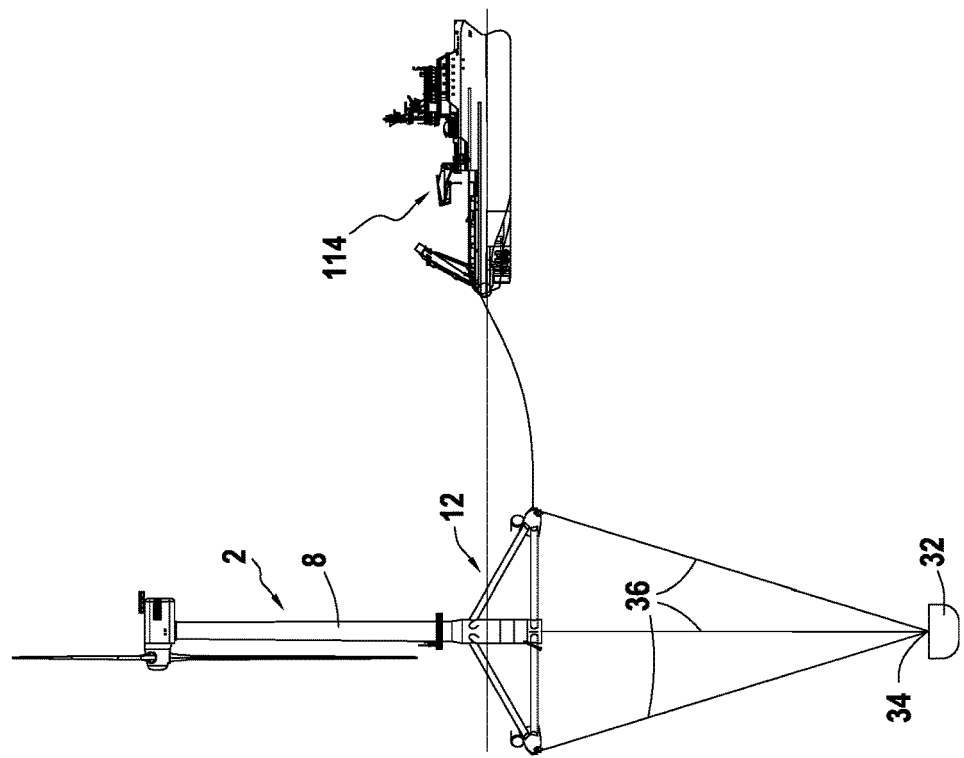
Figure 6P:
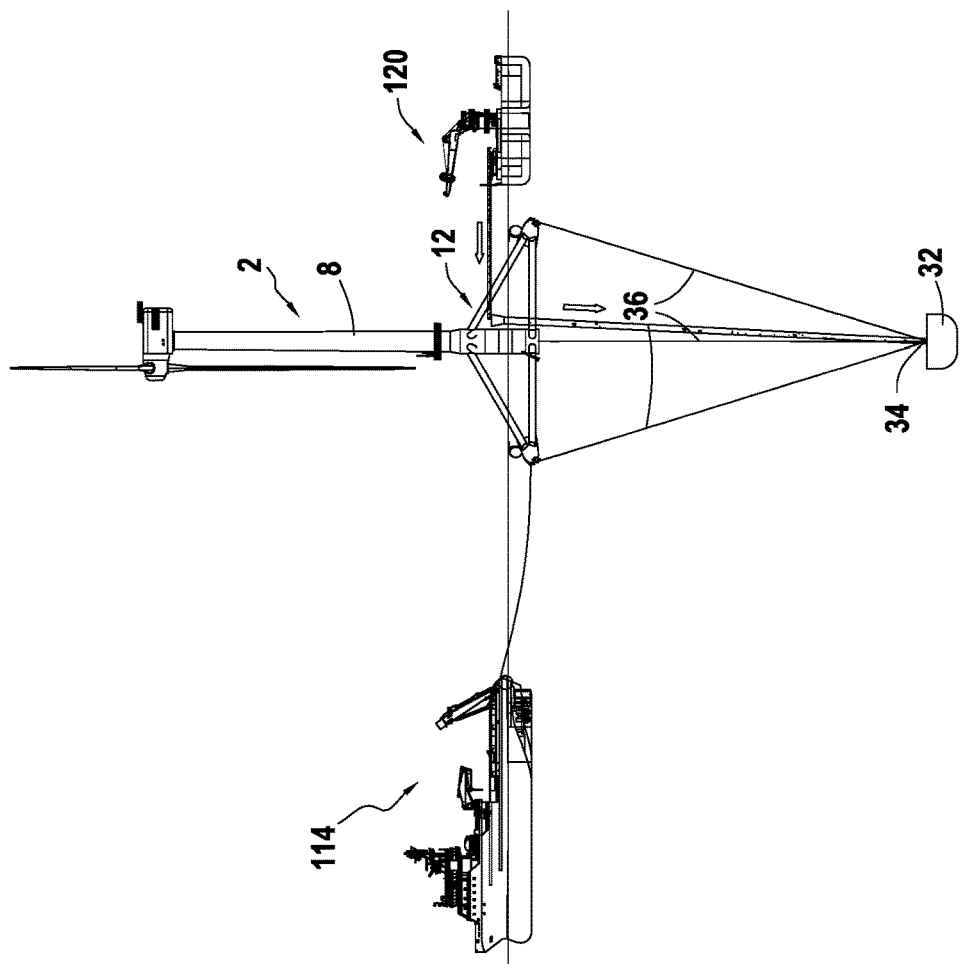

As represented in FIG. 6Q, the filling of the basket 32 of the counterweight with the ballasting material 34 has the consequence of immersing the float 12, this immersion being controlled to allow the bottom of the float 12 of the floating support structure to be located at its immersion depth (typically 25 m).

It will be noted that the counterweight can comprise a plurality of baskets each receiving a ballast material and positioned vertically one below the other while being evenly spaced (for example every 10 m).

In connection with FIGS. 7A to 7K, there will now be described a method for installing, according to a second embodiment of the invention, an offshore wind turbine provided with a floating support structure as described above.

During a first step (FIG. 7A), a barge 200 prepares the temporary area of the seabed in order to allow it to withstand the weight of the baskets filled with ballast of the counterweights of several floating support structures. This preparation consists in discharging on the seabed a filling material allowing the seabed to be able to withstand the weight of the baskets loaded with ballast material while keeping acceptable attitude stability.

Once the seabed is prepared, a set of empty baskets 32 of counterweights are descended into the sea from the barge 200 and placed on the seabed using a crane 202 (FIG. 7B). The counterweight baskets are placed one after the other during the progression of the barge, their number depending on the number of offshore wind turbines of the field to be installed (FIG. 7C).

As represented in FIG. 7D, the counterweight baskets 32 placed on the seabed are then filled one after the other with a ballast material 34 from the barge. Once the baskets are filled with ballast material, temporary buoys 204 are connected to these baskets by means of the crane 202 of the barge and using a ROV 206 (FIG. 7E). FIG. 7F shows the set of the counterweight baskets each provided with several temporary buoys 204.

During the next step represented in FIG. 7G, the float 12 of the floating support structure on which the mast 8 of a wind turbine has been previously mounted is then towed by a tug 208 vertically to a basket 32 of the counterweight. At low tide, the main structure of the float is then connected to the basket of the counterweight by means of the ballast links 36 (FIG. 7G).

Due to the effect of the flood tide, the basket 32 of the counterweight is lifted from the seabed by means of the ballast links 36 (FIG. 7H) in order to allow towing of the float 12 and of the basket by the tug 208 up to the area of implantation of the wind turbine at sea (FIG. 7I).

Once the float 12 and the basket of the counterweight are positioned and maintained vertical to the chosen implantation area, the barge 200 is brought to disconnect one after the other the temporary buoys 204 from the basket 32. This operation is carried out by means of the ROV 206 which disconnects each temporary buoy and lifts it on board the barge using a rope 210 (FIG. 7J).

Figure 7K:
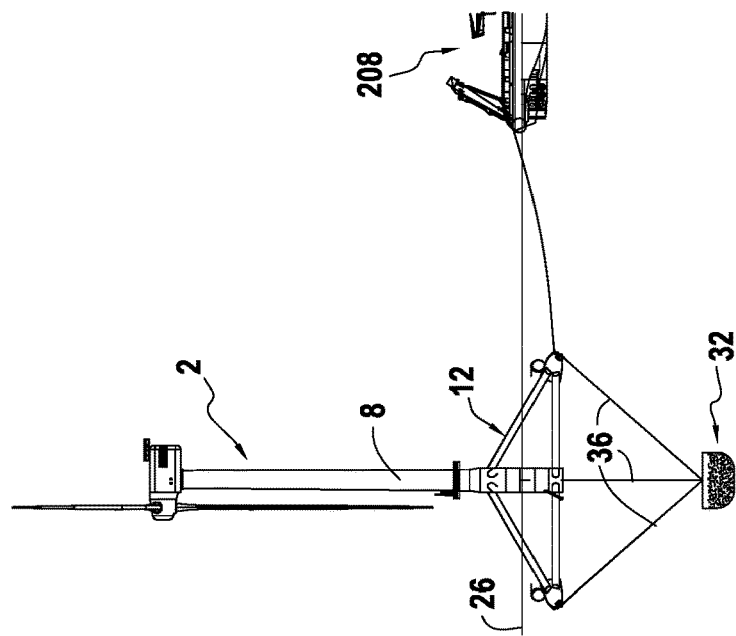
Figure 7J:
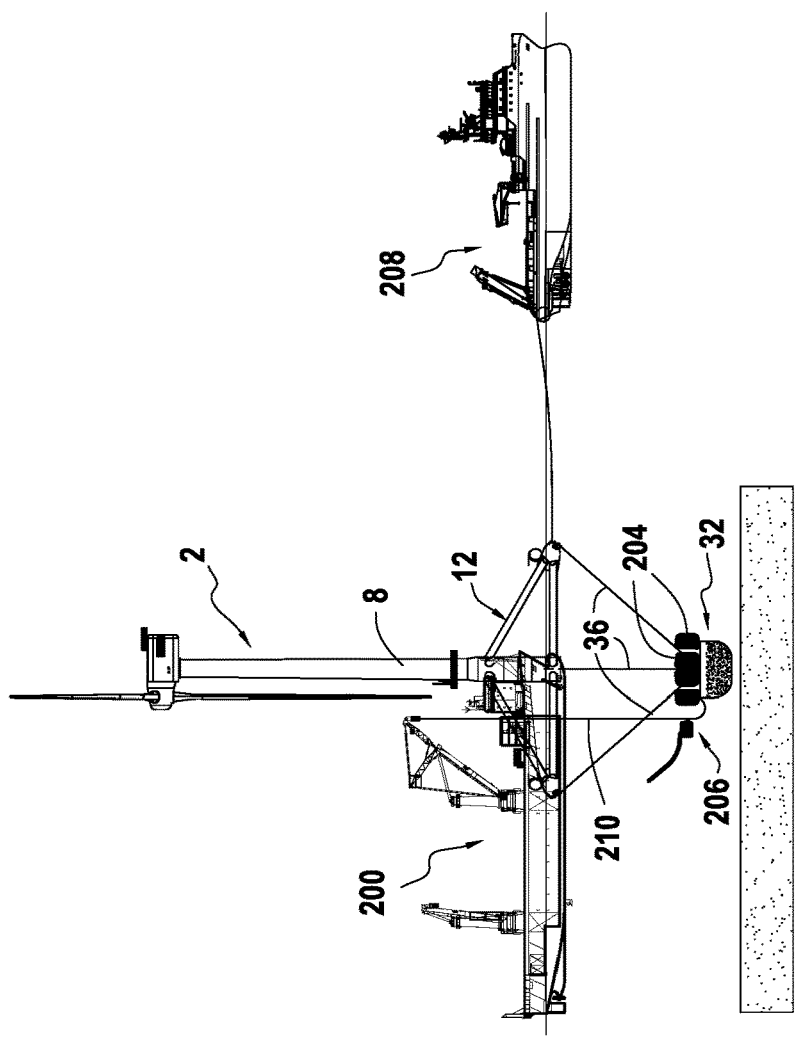

When all the temporary buoys are disconnected, the "ballastable" section of the central structure 26 of the float 12 is filled with seawater in order to adjust the waterline of the float to the desired immersion depth (FIG. 7K).

In a variant of this second embodiment (not represented in the figures), it is provided, instead of the step of preparing the temporary area of the seabed to allow it to withstand the weight of the baskets filled with ballast of the counterweights, to place on the seabed a system for descending the counterweight.

In this variant, the raising system can thus totally or partially replace the effect of the flood tide on the relative position of the basket relative to the bottom. Depending on the cases, the filling of the basket with ballast material can be done entirely or partially on the basket placed on the raising system. In the case where the filling is done partially on the basket placed on the raising system, additional ballast material is made once the basket is detached from the raising system.

This system for descending the counterweight comprises a wide base allowing the seabed to withstand the weight of the system and the empty basket of the counterweight of the floating support structure according to the invention. Once the empty basket is descended and laid on the base, the steps of the installation method are carried out similarly to those described above in connection with FIGS. 7D to 7K.

This variant may be preferred because it has the advantage of not being dependent on the tide.

In connection with FIGS. 8A to 8H, there will be described a third embodiment of the method for installing, according to the invention, an offshore wind turbine provided with a floating support structure as described above.

This variant is particularly advantageous for the dynamic behavior of the counterweight during the descent by linking the basket of the latter to the float by means of several catenary chains, which makes it possible to decouple the movements of each of them. In addition, no preparation of the seabed is required.

According to a first step illustrated in FIG. 8A, a first tug 300 is used to tow at sea the float 12 of the floating support structure on which the mast of a wind turbine 2 has been previously mounted. The empty basket 32 of the counterweight of the floating support structure is in for its part towed independently by a second tug 302.

Note that to facilitate the towing of the basket of the counterweight, the latter can be provided with temporary buoys 304. It will also be noted that the two tugs 300, 302 are each equipped with a dynamic positioning system.

Once arrived in the area of implantation of the wind turbine at sea, the tugs 300, 302 maneuver to bring the float 12 closer to the basket 32 in order to allow the establishment of the connections between these two elements (FIG. 8B).

These connections are in particular the ballast links 36 connecting the basket 32 to each end of the tubes of the main structure of the float. This operation can be carried out using a dynamically positioned connection vessel 306.

Figure 8C:
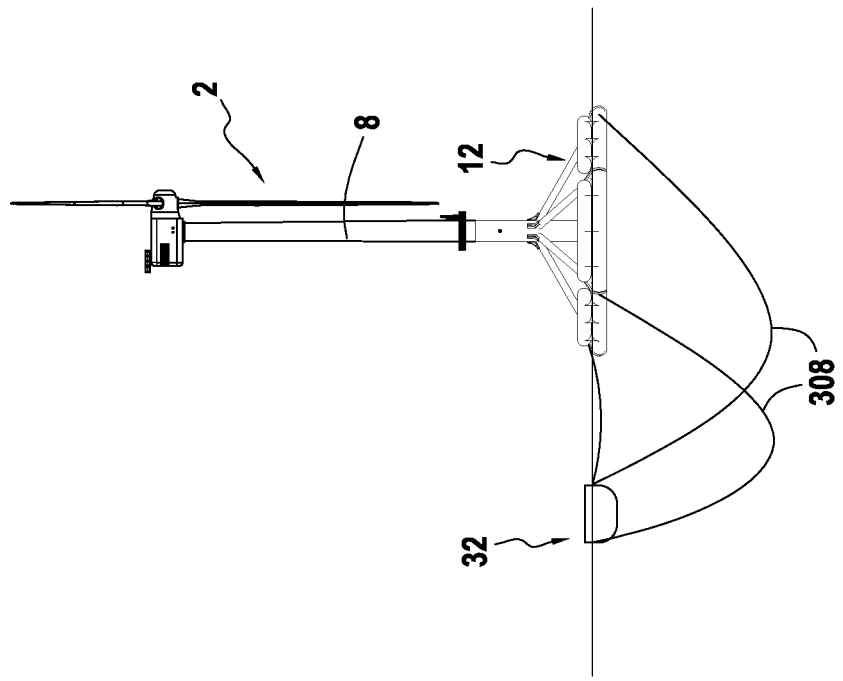
Figure 8D:
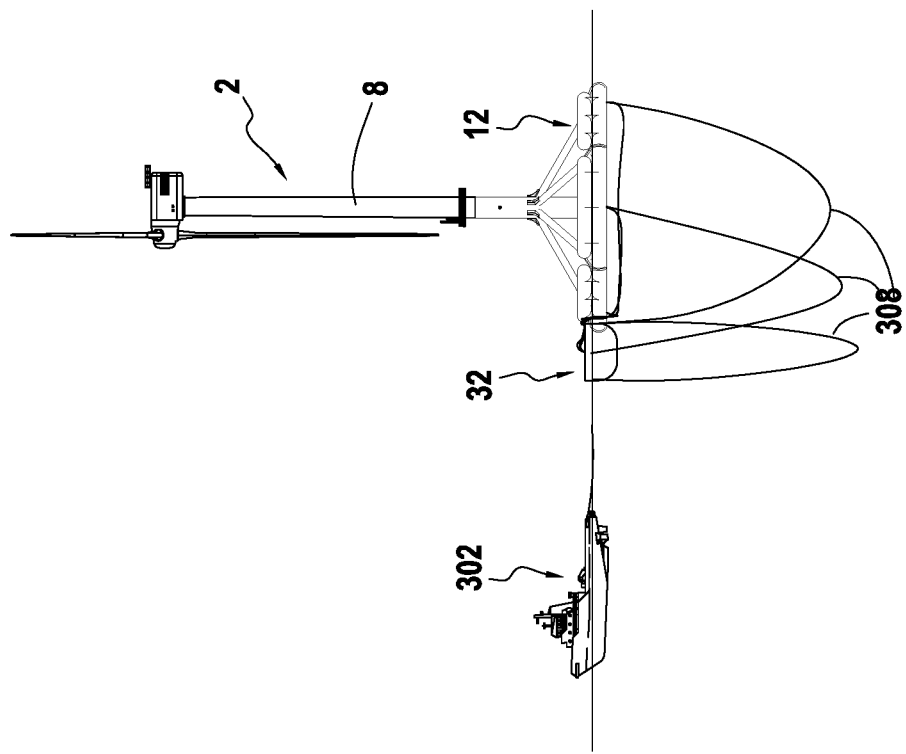

As represented in FIG. 8C, sinking chains 308 are also connected between different points of the basket 32 and the main structure of the float 12. These sinking chains are for example three in number. During these operations, other retaining links (not represented in the figures) can be connected between the basket and the float to limit the remoteness of the float relative to the basket.

Figure 8F:
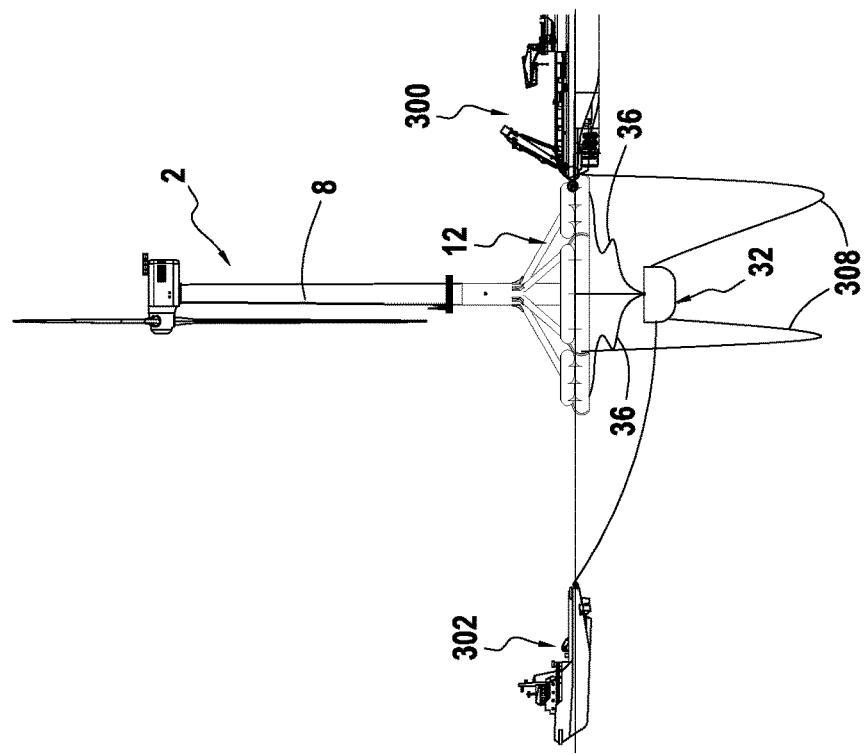
Figure 8E:
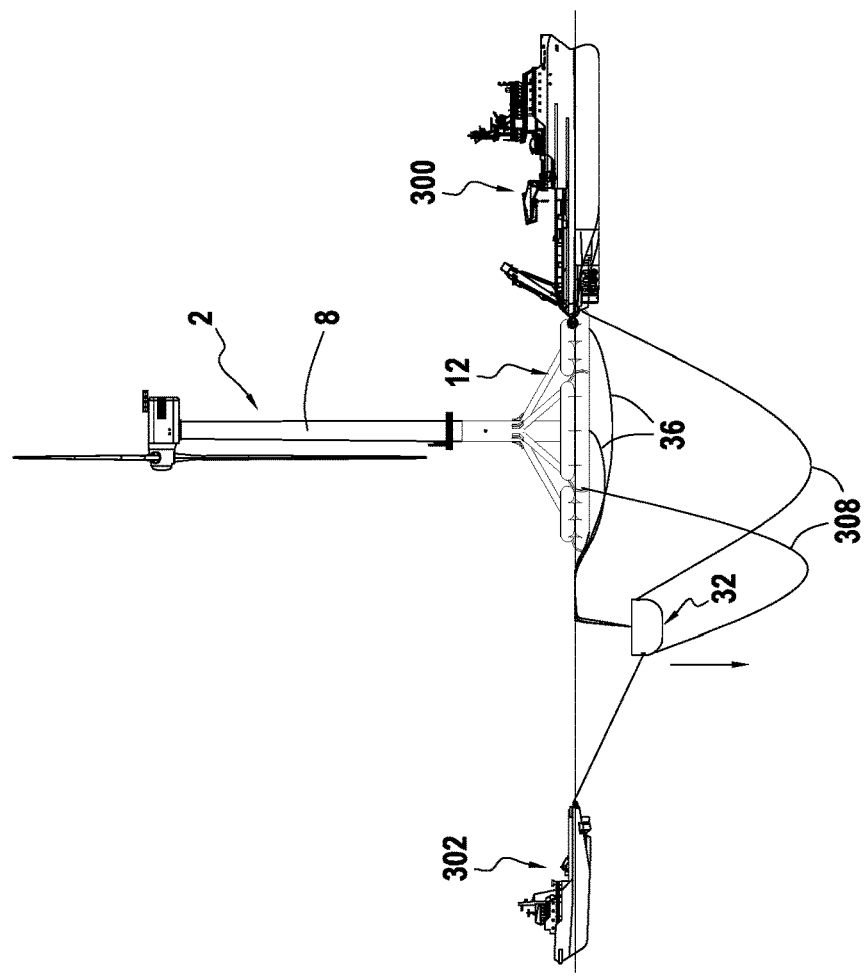

During the next step, the basket 32 of the counterweight is moved away from the float 12 and then gradually immersed by reduction of the floatation of the temporary buoys 304 or by addition of weight in the basket (FIG. 8E). The immersion of the basket is continued until a first equilibrium position under the float (FIG. 8F).

The basket 32 of the counterweight is descended further by reducing in a continuous or a stepwise manner the floatation of the temporary buoys (or by addition of sinker). It will be noted that the descent of the basket results in a reduction in the catenary of the sinking chains 308 under the basket and therefore in the weight that must be compensated by floatation. A process is envisaged in which the descent of the basket would automatically cause the drop in its floatation and also a drop in the sinker with an offset such that the speed of descent of the basket would be sufficiently low.

The descent of the basket ends when the ballast links 36 are stretched (FIG. 8G). If necessary, it can be envisaged that the descent automatically stops at desired depths (for example slightly before the ballast links are stretched to be able to ensure that their configuration is acceptable) while ensuring that the loss of sinker is rectified by the loss of floatation at the desired depth.

Finally, the basket 32 of the counterweight is filled with the ballast material 34, for example from a ballasting vessel 310 discharging the ballast material into the basket using a filling spout or tube 312 (FIG. 8H).

This last step can be replaced by the filling of floatation elements linked to the basket in case the sinker was already present in this particular basket having a floatability reserve equivalent to the final weight seen by the ballast links.

It will be noted that the sinking chains 308 can be used to make, where appropriate, an anchoring system for the floating support structure.

In connection with FIGS. 9A to 9C, there will be described a fourth embodiment of the method for installing, according to the invention, an offshore wind turbine provided with a floating support structure as described above.

In this fourth embodiment, it is provided to transport at sea jointly by a tug 400 the float 12 with its empty sinker counterweight basket 32 positioned below the floating support structure up to the area of implantation of the wind turbine (FIG. 9A).

The basket 32 is then descended by a lifting system 402 installed at the level of the platform of the wind turbine 2 until the ballast links are stretched (FIG. 9B). The float 12 connected to the counterweight is then towed up to the area of implantation of the wind turbine and the basket 32 can then be filled with ballast material from a ballasting vessel 404 as described above (this is to say by means of a tube 406 connecting the basket to the ballasting vessel—see FIG. 9C).

In connection with FIGS. 10A to 10D, there will now be described a fifth embodiment of the method for installing, according to the invention, an offshore wind turbine provided with a floating support structure as defined above.

Figure 10B:
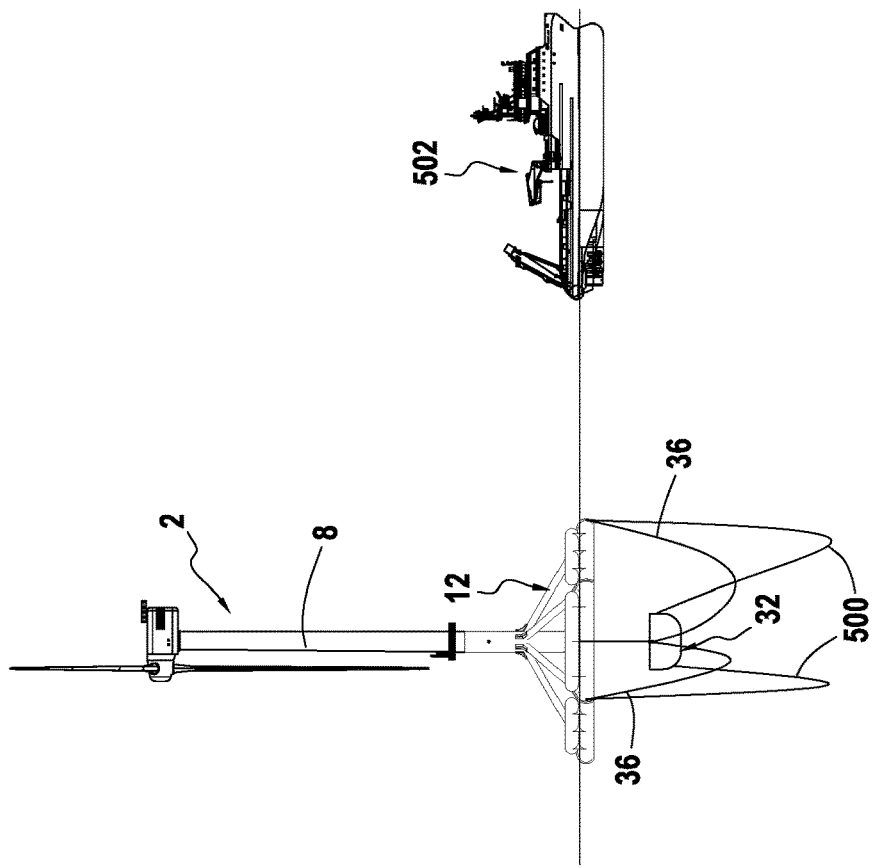
Figure 10A:
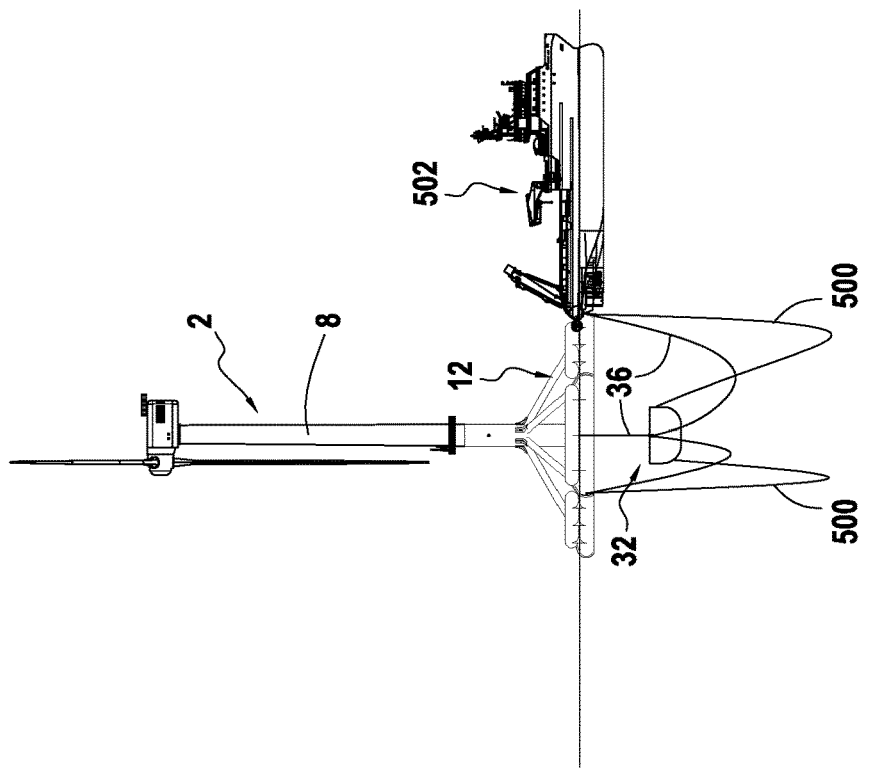

In this fifth embodiment, the method comprises, in a first step illustrated in FIG. 10A, the connection of ballast links 36 and sinking chains 500 between the basket 32 of the counterweight and the float 12. Once this operation has been carried out, the float connected to the counterweight is towed at sea using a tug 502 up to the area of implantation of the wind turbine (FIG. 10B). Jointly, the empty basket 32 of the counterweight positioned under the floating support structure and its float is transported to sea.

The basket is gradually immersed by ballasting and its position is controlled by the catenary effect of the sinking chains to descend it into an equilibrium position under the float (FIG. 10C).

The basket 32 is then descended under the float until the ballast links 36 are stretched, then it is filled with ballast material in order to immerse the float (FIG. 10D). Finally, the float connected to the counterweight is towed up to the area of implantation of the wind turbine.

In connection with FIGS. 11A to 11F, there will now be described a sixth embodiment of the method for installing according to the invention an offshore wind turbine provided with a floating support structure as defined above.

In this sixth embodiment, the method comprises, in a first step illustrated in FIG. 11A, the transport at sea by a tug 600 of the basket 32 of the counterweight removably positioned inside a submersible floating support structure 602 up to the area of implantation of the wind turbine.

In this embodiment, the basket 32 of the counterweight is previously filled with ballast material and the submersible floating support structure 602 is filled with air at atmospheric pressure before departure in order to have the floatability necessary to maintain in floatation the basket of the counterweight.

As represented in FIGS. 11B and 11C, once arrived on the area of implantation of the wind turbine, the counterweight basket 32 and the submersible floating support structure 602 are descended underwater by a system of ballast chains 604 attached to the submersible floating support structure until reaching the desired depth. For this purpose, the ballast chains 604 have a predefined linear weight and are attached to the submersible floating support structure using a second tug 600'. Anchors 606 can be attached to the ballast chains 604 in order to stabilize the counterweight basket (FIG. 11C).

The wind turbine with its float 12 is then towed up to the area of implantation of the wind turbine and positioned vertically to the counterweight basket 32 (FIG. 11D). The ballast links 36 previously connected to the float 12 are then descended and connected one by one to the counterweight basket 32 by means, for example, of a remotely operated vehicle 108 (FIG. 11E).

During the next step, the submersible floating support structure 602 is gradually filled with water (in replacement of air) in order to lose floatability. During this filling, it descends with the counterweight basket until the ballast links 36 are tensioned. The descent of the basket is then stopped and the weight of the basket is gradually transferred to the float 12 of the wind turbine whose ballast links 36 stretch under the weight of the basket of the counterweight (FIG. 11F).

When the entire weight of the basket is transferred to the float of the wind turbine, the submersible floating support structure 602 continues to descend in order to disengage completely from the counterweight basket 32. When it is filled with water, it is then located above the seabed at a distance of a few meters under the basket, the ballast chains 604 ensuring its holding in this position. The wind turbine and its counterweight can then be towed by the tug 600 up to their implantation area.

In a variant (not represented in the figures) of this sixth embodiment, the counterweight basket is only partially filled beforehand with ballast material. After the wind turbine and its counterweight have been towed on the implantation area, a ship transporting the rest of the ballast material is positioned in the vicinity of the wind turbine and fills the counterweight basket using flexible piping until the wind turbine reaches the required draft.

In a seventh embodiment (not represented in the figures) of the method for installing, according to the invention, an offshore wind turbine provided with a floating support structure as defined above, the counterweight basket is provided with air ballast compartments.

This basket is previously poured into the port and the float of the wind turbine is positioned vertically to the basket in order to connect the ballast links by divers. Other shorter (about 5 meters) temporary links are connected between the float and the basket. The basket is then "deballasted" in order to stick to the float of the wind turbine. The assembly is towed up to a sheltered water site of about 20 m water depth where the basket is ballasted until it becomes heavy and is taken in tension by the temporary links. The assembly is then towed up to the area of implantation of the wind turbine where the wind turbine is moored. The temporary links are disconnected and the basket descends into the water column until it is taken in tension by the ballast links.

Thereafter, a ship transporting the rest of the ballast material is positioned in the vicinity of the wind turbine and fills the counterweight basket using flexible piping until the wind turbine reaches the required draft.

It will be noted that, as for the sixth embodiment, this seventh embodiment can be implemented with a counterweight basket which is completely or only partially filled beforehand with ballast material.

The invention claimed is:

1. A floating support structure for an offshore wind turbine, comprising a float intended to be partly immersed and on which a wind turbine mast is intended to be assembled, and a counterweight connected to the float and intended to be immersed under the float, wherein:
   the float comprises:
   a toroid or polygonshaped main structure with at least five sides which is formed by at least one tube intended to be immersed;
   a central tubular structure having a diameter adapted to receive the mast of the wind turbine and comprising a section able to be ballasted in order to adjust the waterline of the float;
   a first series of horizontal struts evenly distributed about a vertical axis and connecting the main structure to the central structure; and
   a second series of oblique struts evenly distributed about a vertical axis and connecting the main structure to the central structure at an angle comprised between 15° and 60° with the horizontal struts;
   and in that the counterweight comprises a basket able to receive ballast material and ballast links connecting the basket to the main structure of the float at an angle (ß) comprised between 15° and 45° with the vertical axis.

2. The structure according to claim 1, wherein the counterweight comprises a plurality of baskets each able to receive a ballast material and positioned vertically below each other while being evenly spaced apart.

3. The structure according to claim 1, wherein the oblique struts form an angle (a) of 30° with the horizontal struts.

4. A method for installing at sea an offshore wind turbine provided with a floating support structure according to claim 1, comprising the successive steps of:
- transporting at sea and placing on the seabed an empty basket of the counterweight of the floating support structure;
- filling the basket of the counterweight laid on the seabed with ballast material;
- towing at sea the float of the floating support structure up to the vertical of the filled basket of the counterweight;
- connecting at low tide of the main structure of the float to the filled basket of the counterweight by means of ballast links;
- tensioning the ballast links and releasing the basket of the counterweight by effect of the flood tide; and
- towing at sea the float connected to the counterweight up to the area of implantation of the wind turbine.

5. The method according to claim 4, wherein buoys are connected to the basket of the counterweight to reduce the weight thereof upon detachment of the seabed.

6. The method according to claim 4, wherein the basket of the counterweight is placed on the seabed using a raising system on which the basket rests.

7. A method for installing an offshore wind turbine provided with a floating support structure according to claim 1, comprising the successive steps of:
- transporting at sea separately an empty and floating basket of the counterweight of the floating support structure and its float;
- connecting ballast links and sinking chains between the basket and the float;
- immersing the basket by gradually ballasting it and controlling its position by the catenary effect of the sinking chains to descend it into an equilibrium position under the float;
- descending the basket under the float until the ballast links are stretched;
- filling the basket of the counterweight with ballast material in order to partially immerse the float; and
- towing at sea the float connected to the counterweight up to the area of implantation of the wind turbine at sea.

8. The method for installing an offshore wind turbine provided with a floating support structure according to claim 1, comprising the steps of:
- transporting at sea an empty basket of the counterweight of the floating support structure;
- descending into the sea the empty basket of the counterweight on which temporary floatation modules have been previously fixed and mooring it to a deadman previously placed at the seabed;
- activating the temporary floatation modules of the basket to allow it to be stabilized in midwater vertically to the deadman;
- towing at sea the float of the floating support structure up to the vertical of the empty basket of the counterweight;
- connecting the main structure of the float to the empty basket of the counterweight by means of ballast links;
- sinking the empty basket of the counterweight to allow its disconnection from the deadman;
- filling the basket of the counterweight with ballast material in order to partially immerse the float; and
- towing at sea the float connected to the counterweight up to the area of implantation of the wind turbine.

9. The method for installing an offshore wind turbine provided with a floating support structure according to claim 1, comprising the successive steps of:
- transporting jointly a basket of the counterweight positioned under the floating support structure and its float;
- vertically descending the basket by means of a lifting system integrated at the level of the float;
- towing at sea the float connected to the counterweight up to the area of implantation of the wind turbine; and
- filling with ballast material the basket of the counterweight suspended from the structure of the float.

10. The method for installing an offshore wind turbine provided with a floating support structure according to claim 1, comprising the successive steps of:
- connecting ballast links and sinking chains between the basket of the counterweight and the float;
- towing at sea jointly the float connected to the counterweight positioned under the floating support structure up to the area of implantation of the wind turbine;
- immersing the basket by gradually ballasting it and controlling its position by the catenary effect of the sinking chains to descend it into an equilibrium position under the float;
- descending the basket under the float until the ballast links are stretched; and
- filling the basket of the counterweight with ballast material in order to immerse the float.

11. The method for installing an offshore wind turbine provided with a floating support structure according to claim 1, comprising the successive steps of:
- transporting at sea a basket of the counterweight of the floating support structure positioned in a submersible floating support structure filled with air;
- descending into the sea the submersible floating support structure by a system of ballast chains attached thereto;
- towing at sea the float vertically to the counterweight basket, the ballast links having been previously connected to the float;
- connecting the ballast links to the basket of the counterweight;
- gradually filling the submersible floating support structure in order to make it lose floatability until the ballast links are tensioned and the submersible floating support structure disengages completely from the counterweight basket;
- towing at sea the float connected to the counterweight up to the area of implantation of the wind turbine; and
- mooring the float connected to the counterweight on the area of implantation of the wind turbine.

12. The method according to claim 11, wherein the counterweight basket is transported at sea with a basket previously filled with ballast material.

13. The method according to claim 11, wherein the counterweight basket is transported at sea with a basket lightly filled with ballast material, the rest of the ballast material filling the basket once the wind turbine and its counterweight have been towed over the implantation area.

14. A floating support structure for an offshore wind turbine, comprising a float intended to be partly immersed and on which a wind turbine mast is intended to be assembled, and a counterweight connected to the float and intended to be immersed under the float, wherein:
the float comprises:
- a toroid or polygon-shaped main structure with at least five sides which is formed by at least one tube intended to be immersed;

a central tubular structure having a diameter adapted to receive the mast of the wind turbine and comprising a section able to be ballasted in order to adjust the waterline of the float;

a first series of horizontal struts evenly distributed about a vertical axis and connecting the main structure to the central structure; and a second series of oblique struts evenly distributed about a vertical axis and connecting the main structure to the central structure at an angle comprised between 15° and 60° with the horizontal struts;

and in that the counterweight comprises a basket able to receive ballast material and ballast links connecting the basket to the main structure of the float at an angle (α) comprised between 15° and 45° with the vertical axis;

wherein the ballast links form an angle (β) with the vertical axis given by the following equation:

$$\beta = \arctan[(Dc/2 + Lh + Df)/(P - Te - Ep - Gp)]$$

wherein: P is the water depth; Te is the draft measured at the bottom of the main structure; Ep is the thickness of the basket; Gp is the distance between the bottom of the basket and the seabed; Dc is the diameter of the central structure; Lh is the length of the horizontal struts; and Df is the diameter of the tubes of the main structure.

15. A floating support structure for an offshore wind turbine, comprising a float intended to be partly immersed and on which a wind turbine mast is intended to be assembled, and a counterweight connected to the float and intended to be immersed under the float, wherein:

the float comprises:

a toroid or polygon-shaped main structure with at least five sides which is formed by at least one tube intended to be immersed;

a central tubular structure having a diameter adapted to receive the mast of the wind turbine and comprising a section able to be ballasted in order to adjust the waterline of the float;

a first series of horizontal struts evenly distributed about a vertical axis and connecting the main structure to the central structure; and a second series of oblique struts evenly distributed about a vertical axis and connecting the main structure to the central structure at an angle comprised between 15° and 60° with the horizontal struts;

and in that the counterweight comprises a basket able to receive ballast material and ballast links connecting the basket to the main structure of the float at an angle (α) comprised between 15° and 45° with the vertical axis;

wherein the float further comprises an additional floatability structure formed by an assembly of additional floats mounted on the tube of the main structure.

16. A floating support structure for an offshore wind turbine, comprising a float intended to be partly immersed and on which a wind turbine mast is intended to be assembled, and a counterweight connected to the float and intended to be immersed under the float, wherein:

the float comprises:

a toroid or polygon-shaped main structure with at least five sides which is formed by at least one tube intended to be immersed;

a central tubular structure having a diameter adapted to receive the mast of the wind turbine and comprising a section able to be ballasted in order to adjust the waterline of the float;

a first series of horizontal struts evenly distributed about a vertical axis and connecting the main structure to the central structure; and a second series of oblique struts evenly distributed about a vertical axis and connecting the main structure to the central structure at an angle comprised between 15° and 60° with the horizontal struts;

and in that the counterweight comprises a basket able to receive ballast material and ballast links connecting the basket to the main structure of the float at an angle (β) comprised between 15° and 45° with the vertical axis;

wherein the main structure of the float is formed by an assembly of a plurality of tubes which are connected together by means of junction plates welded to the ends of the tubes.

* * * * *

UNITED STATES PATENT AND TRADEMARK OFFICE
CERTIFICATE OF CORRECTION

| | |
|---|---|
| PATENT NO. | : 11,383,799 B2 |
| APPLICATION NO. | : 16/767474 |
| DATED | : July 12, 2022 |
| INVENTOR(S) | : Christophe Colmard et al. |

It is certified that error appears in the above-identified patent and that said Letters Patent is hereby corrected as shown below:

On the Title Page

Item (22) change:
"PCT Filed: Dec. 27, 2018"
To:
-- PCT Filed: Nov. 27, 2018 --

Signed and Sealed this
Twentieth Day of June, 2023

Katherine Kelly Vidal
*Director of the United States Patent and Trademark Office*